US012063329B2

(12) United States Patent
Mizoguchi et al.

(10) Patent No.: US 12,063,329 B2
(45) Date of Patent: Aug. 13, 2024

(54) INFORMATION PROCESSING APPARATUS, METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventors: Yoshinori Mizoguchi, Tokyo (JP); Hiroyasu Kunieda, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/986,085

(22) Filed: Nov. 14, 2022

(65) Prior Publication Data

US 2023/0171349 A1 Jun. 1, 2023

(30) Foreign Application Priority Data

Nov. 29, 2021 (JP) ................................. 2021-193564

(51) Int. Cl.
| | |
|---|---|
| *H04N 1/00* | (2006.01) |
| *H04N 1/23* | (2006.01) |
| *H04N 1/32* | (2006.01) |
| *H04N 1/40* | (2006.01) |

(52) U.S. Cl.
CPC ..... *H04N 1/00217* (2013.01); *H04N 1/00233* (2013.01); *H04N 1/00915* (2013.01); *H04N 1/0097* (2013.01); *H04N 1/2307* (2013.01); *H04N 1/32646* (2013.01); *H04N 1/40068* (2013.01); *H04N 2201/3202* (2013.01)

(58) Field of Classification Search
CPC .......... H04N 1/00214; H04N 1/00233; H04N 1/40068; H04N 1/33323
See application file for complete search history.

(56) References Cited

U.S. PATENT DOCUMENTS

| | | | |
|---|---|---|---|
| 9,304,719 B1* | 4/2016 | Bilan ..................... | G06F 3/1241 |
| 10,455,104 B2* | 10/2019 | Okano .................. | G06F 3/1286 |
| 2010/0225984 A1* | 9/2010 | Niina .................. | H04N 1/40062 |
| | | | 358/538 |
| 2013/0016726 A1* | 1/2013 | Numakura ............... | G11C 8/16 |
| | | | 370/394 |
| 2014/0355022 A1* | 12/2014 | Oda ....................... | G06F 3/1285 |
| | | | 358/1.15 |

(Continued)

FOREIGN PATENT DOCUMENTS

JP   H09-330186 A   12/1997

*Primary Examiner* — Benjamin O Dulaney
(74) *Attorney, Agent, or Firm* — VENABLE LLP

(57) ABSTRACT

An information processing apparatus executes, for image data to be printed by a printing device, image processing corresponding to a content of the image data; transmits, to the printing device, image data obtained after executing the image processing; acquires, before executing the image processing, a first transfer rate with respect to the printing device and a requested transfer rate required by a print operation of a print unit of the printing device; attempts image processing for the image data; and acquires, based on the first transfer rate and information of image data obtained after the attempt, a second transfer rate required by transmission, to the printing device, of the image data obtained after the attempt and the print operation of the print unit.

23 Claims, 16 Drawing Sheets

(56) References Cited

U.S. PATENT DOCUMENTS

2015/0036186 A1* 2/2015 Mikami ............... G06K 15/408
                                                    358/1.15
2019/0065128 A1* 2/2019 Sakurai ................ G06F 3/1247
2019/0155551 A1* 5/2019 Fukumoto ............ G06F 3/1231

* cited by examiner

FIG. 6A
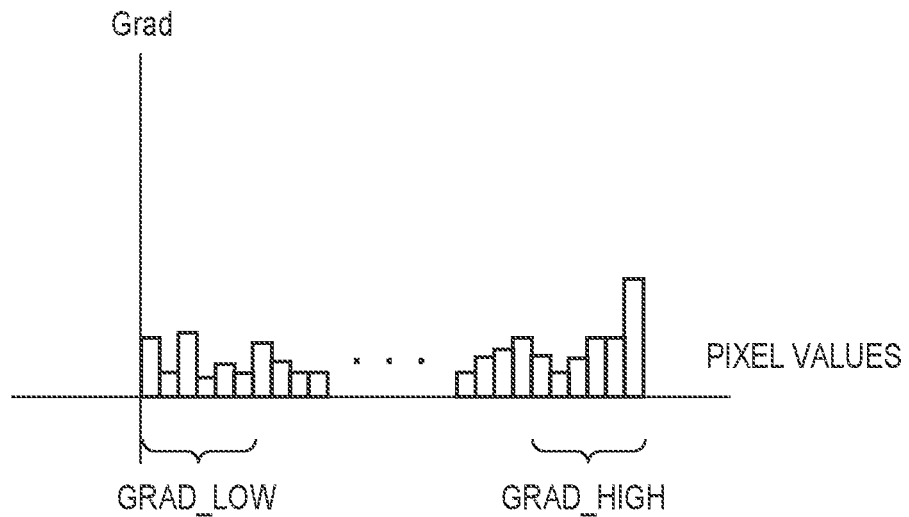
FIG. 6B
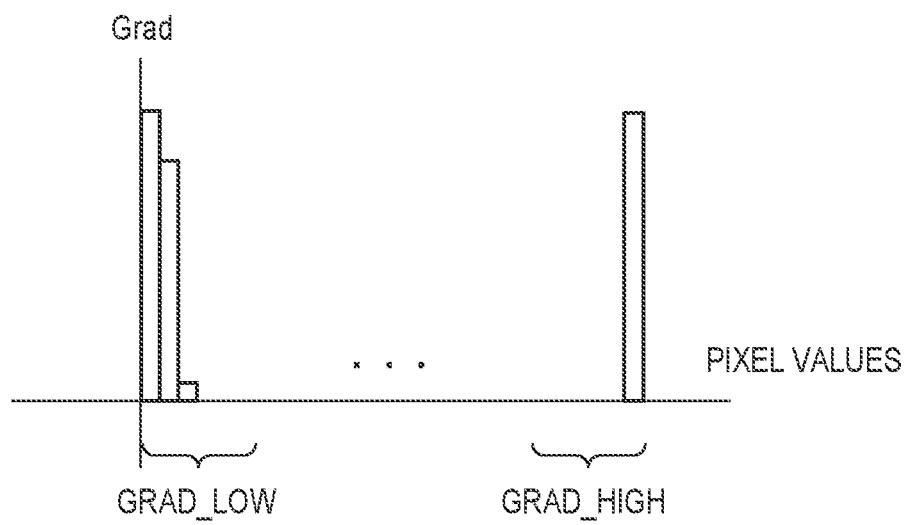
FIG. 7
| SETTING No | JPEG COMPRESSION | MAIN SCANNING RESOLUTION | SUB-SCANNING RESOLUTION | TONE COUNT |
|---|---|---|---|---|
| 1 | DEFAULT | DEFAULT | DEFAULT | DEFAULT |
| 2 | SETTING 1 | SETTING 1 | SETTING 1 | SETTING 1 |
| 3 | SETTING 2 | SETTING 2 | SETTING 2 | SETTING 2 |

FIG. 8A

| | PHOTO | | | |
|---|---|---|---|---|
| PRIORITY No | JPEG COMPRESSION | MAIN SCANNING RESOLUTION | SUB-SCANNING RESOLUTION | TONE COUNT |
| 1 | DEFAULT | DEFAULT | DEFAULT | DEFAULT |
| 2 | SETTING 1 | DEFAULT | DEFAULT | DEFAULT |
| 3 | SETTING 2 | DEFAULT | DEFAULT | DEFAULT |
| ⋮ | ⋮ | ⋮ | ⋮ | ⋮ |
| IP_SELECT | SETTING 2 | SETTING 2 | SETTING 2 | SETTING 2 |

FIG. 8B

| | DOCUMENT | | | |
|---|---|---|---|---|
| PRIORITY No | JPEG COMPRESSION | MAIN SCANNING RESOLUTION | SUB-SCANNING RESOLUTION | TONE COUNT |
| 1 | DEFAULT | DEFAULT | DEFAULT | DEFAULT |
| 2 | DEFAULT | DEFAULT | DEFAULT | SETTING 1 |
| 3 | DEFAULT | DEFAULT | DEFAULT | SETTING 2 |
| ⋮ | ⋮ | ⋮ | ⋮ | ⋮ |
| IP_SELECT | SETTING 2 | SETTING 2 | SETTING 2 | SETTING 2 |

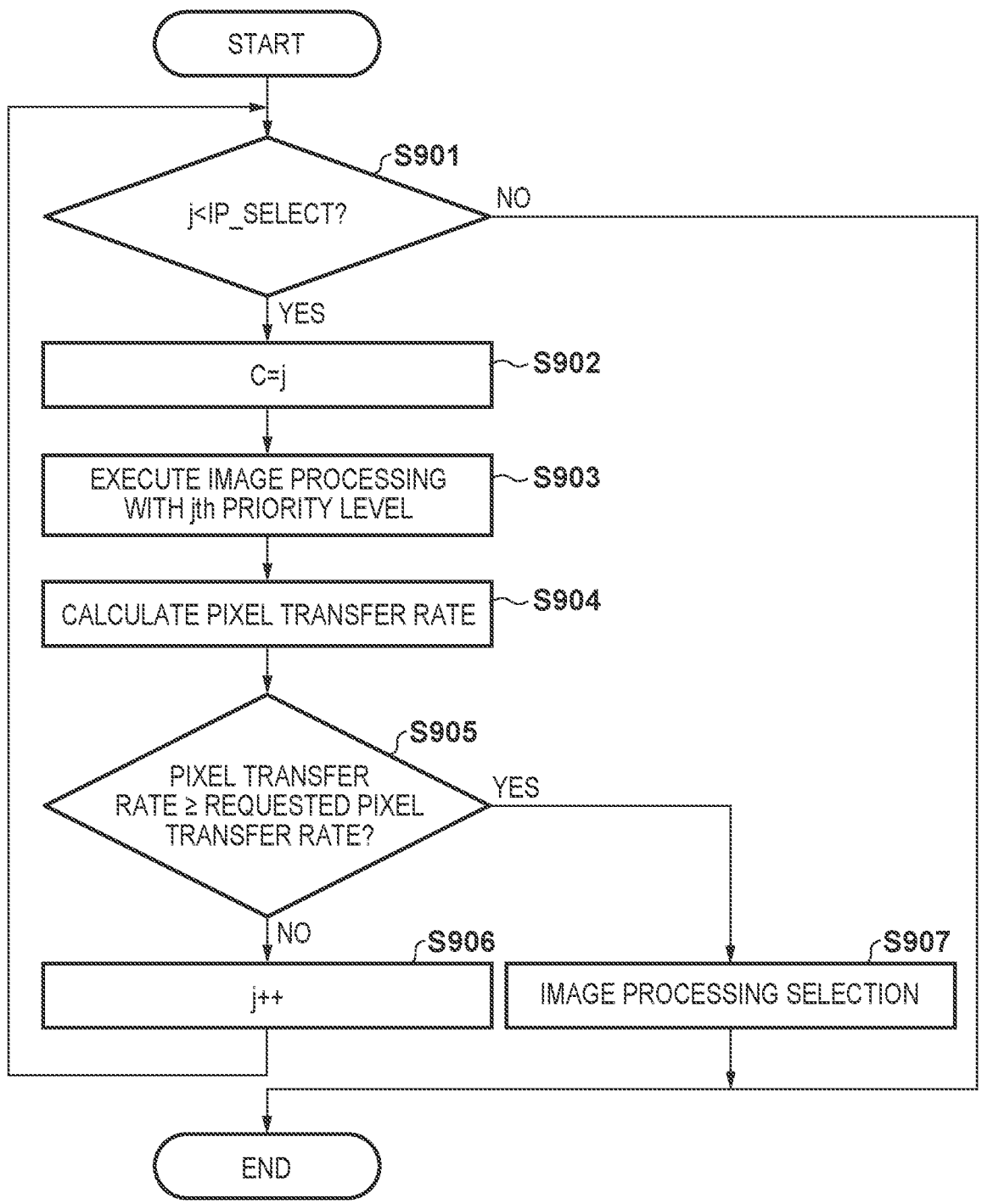

FIG. 11

| SETTING No | JPEG COMPRESSION | MAIN SCANNING RESOLUTION | SUB-SCANNING RESOLUTION | TONE COUNT | DOT DATA CONVERSION | COLOR COUNT |
|---|---|---|---|---|---|---|
| 1 | DEFAULT | DEFAULT | DEFAULT | DEFAULT | DEFAULT | DEFAULT |
| 2 | SETTING 1 | SETTING 1 | SETTING 1 | SETTING 1 | SETTING 1 | SETTING 1 |
| 3 | SETTING 2 | SETTING 2 | SETTING 2 | SETTING 2 | SETTING 2 | SETTING 2 |
| 4 | NOT PERFORMED | | | NOT PERFORMED | NOT PERFORMED | NOT PERFORMED |

FIG. 12A

PHOTO-PORTRAIT

| PRIORITY No | JPEG COMPRESSION | MAIN SCANNING RESOLUTION | SUB-SCANNING RESOLUTION | TONE COUNT | DOT DATA CONVERSION | COLOR COUNT |
|---|---|---|---|---|---|---|
| 1 | NOT PERFORMED | DEFAULT | DEFAULT | NOT PERFORMED | DEFAULT | DEFAULT |
| 2 | DEFAULT | DEFAULT | DEFAULT | DEFAULT | NOT PERFORMED | NOT PERFORMED |
| 3 | SETTING 1 | DEFAULT | DEFAULT | DEFAULT | NOT PERFORMED | NOT PERFORMED |
| 4 | SETTING 2 | DEFAULT | DEFAULT | DEFAULT | NOT PERFORMED | NOT PERFORMED |
| ... | ... | ... | ... | ... | ... | ... |
| IP_SELECT | SETTING 2 | SETTING 2 | SETTING 2 | SETTING 2 | NOT PERFORMED | NOT PERFORMED |

FIG. 12B

PHOTO-LANDSCAPE

| PRIORITY No | JPEG COMPRESSION | MAIN SCANNING RESOLUTION | SUB-SCANNING RESOLUTION | TONE COUNT | DOT DATA CONVERSION | COLOR COUNT |
|---|---|---|---|---|---|---|
| 1 | NOT PERFORMED | DEFAULT | DEFAULT | NOT PERFORMED | DEFAULT | DEFAULT |
| 2 | NOT PERFORMED | DEFAULT | DEFAULT | NOT PERFORMED | DEFAULT | SETTING 1 |
| 3 | DEFAULT | DEFAULT | DEFAULT | DEFAULT | NOT PERFORMED | NOT PERFORMED |
| 4 | SETTING 1 | DEFAULT | DEFAULT | DEFAULT | NOT PERFORMED | NOT PERFORMED |
| ... | ... | ... | ... | ... | ... | ... |
| IP_SELECT | NOT PERFORMED | SETTING 2 | SETTING 2 | NOT PERFORMED | SETTING 2 | SETTING 2 |

FIG. 12C

DOCUMENT

| PRIORITY No | JPEG COMPRESSION | MAIN SCANNING RESOLUTION | SUB-SCANNING RESOLUTION | TONE COUNT | DOT DATA CONVERSION | COLOR COUNT |
|---|---|---|---|---|---|---|
| 1 | NOT PERFORMED | DEFAULT | DEFAULT | NOT PERFORMED | DEFAULT | DEFAULT |
| 2 | NOT PERFORMED | DEFAULT | DEFAULT | NOT PERFORMED | SETTING 1 | DEFAULT |
| 3 | NOT PERFORMED | DEFAULT | DEFAULT | NOT PERFORMED | SETTING 1 | SETTING 1 |
| 4 | | | | | SETTING 1 | SETTING 2 |
| ... | ... | ... | ... | ... | ... | ... |
| IP_SELECT | SETTING 2 | SETTING 2 | SETTING 2 | SETTING 2 | NOT PERFORMED | NOT PERFORMED |

FIG. 17

| HISTORY No | REGION | CLIMATE | HUMIDITY | COMMUNICATION TIME PERIOD | COMMUNICATION TRANSFER RATE [bit/sec] |
|---|---|---|---|---|---|
| 1 | A | RAINY | HIGH | 12:00-14:00 | 100 |
| 2 | B | SUNNY | LOW | 14:00-16:00 | 300 |
| 3 | C | CLOUDY | INTERMEDIATE | 10:00-12:00 | 200 |
| 4 | B | CLOUDY | HIGH | 14:00-16:00 | 270 |
| 5 | A | SUNNY | HIGH | 18:00-20:00 | 130 |
| 6 | C | CLOUDY | INTERMEDIATE | 14:00-16:00 | 180 |
| 7 | C | RAINY | HIGH | 18:00-20:00 | 120 |
| 8 | D | RAINY | HIGH | 10:00-12:00 | 50 |
| 9 | A | CLOUDY | HIGH | 16:00-18:00 | 110 |
| 10 | D | RAINY | HIGH | 10:00-12:00 | 60 |
| ... | ... | ... | ... | ... | ... |

INFORMATION PROCESSING APPARATUS, METHOD, AND NON-TRANSITORY COMPUTER-READABLE STORAGE MEDIUM STORING PROGRAM

BACKGROUND OF THE INVENTION

Field of the Invention

The present invention relates to an information processing apparatus capable of communicating with a printing device, a method, and a non-transitory computer-readable storage medium storing a program.

Description of the Related Art

There is known a service for successively transmitting, to a printer, printing job data accumulated in a cloud server as a host device and printing the data on the printer side. In such arrangement, a communication path including a public line is used. Therefore, as compared with printing from a PC or a smartphone, it is difficult to predict a communication time, which is largely influenced by fluctuations in communication speed caused by including the public line and the physical distance between the printer and a location where the cloud server is installed.

If, when a printing procedure is performed in such communication environment, data transfer from the host device is delayed with respect to scanning of the printhead of the printer, this may stop printing. If sufficient data are accumulated in the memory of the printer, printing is resumed but unevenness occurs due to the influence of a difference in ink landing time on a print medium, thereby causing image deterioration.

Japanese Patent Laid-Open No. 9-330186 describes an arrangement for avoiding the stop of printing caused by a delay of data transfer. Japanese Patent Laid-Open No. 9-330186 describes an arrangement for switching the resolution in accordance with a data transfer rate between a host device as the transmission side of image data and a printer as the reception side of the image data and a requested data transfer rate based on a data amount corresponding to a print width to be printed by the printer.

SUMMARY OF THE INVENTION

The present invention in one aspect provides an information processing apparatus capable of communicating with a printing device, comprising: an image processing unit configured to execute image processing for image data to be printed by the printing device; a transmission unit configured to transmit, to the printing device, image data obtained after executing the image processing; a first acquisition unit configured to acquire, before executing the image processing by the image processing unit, a first transfer rate with respect to the printing device and a requested transfer rate required by a print operation of a print unit of the printing device; and a second acquisition unit configured to acquire, based on the first transfer rate and information of image data obtained after the image processing unit attempts the image processing for the image data, a second transfer rate required by transmission, to the printing device, of the image data obtained after the attempt and the print operation of the print unit, wherein if the second transfer rate satisfies a condition of the requested transfer rate, the image processing unit executes the attempted image processing for the image data, and the transmission unit transmits, to the printing device, image data obtained after executing the image processing.

Further features of the present invention will become apparent from the following description of exemplary embodiments with reference to the attached drawings.

BRIEF DESCRIPTION OF THE DRAWINGS

FIGS. 6A and 6B are histograms each acquired by the processing shown in FIG. 5;
FIG. 7 is a table for determining setting contents of image processing;
FIGS. 8A and 8B are tables each showing a priority table;
FIG. 9 is a flowchart illustrating processing of selecting image processing;
FIG. 11 is a table for determining setting contents of image processing;
FIGS. 12A to 12C are tables each showing a priority table;
FIG. 17 is a table showing a communication history table.

DESCRIPTION OF THE EMBODIMENTS

Figure 1:
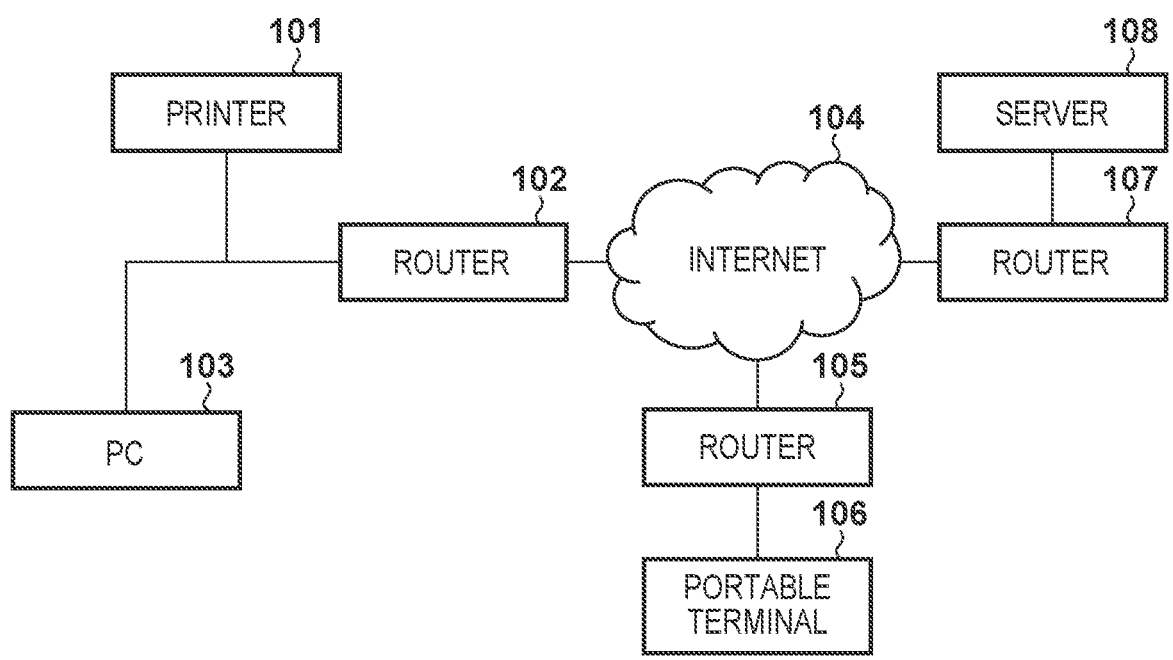
FIG. 1 is a view showing the configuration of a network.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

If the resolution is switched, deterioration of image quality may become conspicuous depending on the type of image data in which, for example, a character size is small. Therefore, an arrangement for appropriately preventing the stop of printing caused by a delay of data transfer is required.

According to the present disclosure, it is possible to suppress deterioration of image quality while appropriately performing data transfer to a printing device.

First Embodiment

FIG. 1 is a view showing an example of the configuration of a network applicable to this embodiment. A printer 101 functioning as an image processing device is connected to a router 102 via a wired cable or wirelessly. The router 102 is further connected to a PC 103 to form a local area network (LAN). Each apparatus connected to the LAN is assigned with an IP address, and the PC 103 can communicate with the printer 101. When a user contracts with an Internet service provider (ISP), the printer 101 and the PC 103 can be connected to the Internet via the router 102.

Another router is connected to the Internet 104, and the printer 101 and the PC 103 can communicate with an apparatus connected to another LAN environment via the Internet 104. For example, it is possible to communicate with a portable terminal 106 such as a smartphone wirelessly connected to a router 105 and a server 108 connected to another router 107. Note that the server 108 may be a cloud server that provides a cloud service, and will be described as the cloud server 108 below.

In this embodiment, the cloud server 108 transmits image data to be printed to the printer 101 via the router 107 and the Internet 104. However, the present invention is not limited to this arrangement, and the portable terminal 106 wirelessly connected to the router 105 or the PC 103 in the same LAN may transmit image data to the printer 101.

Figure 2:
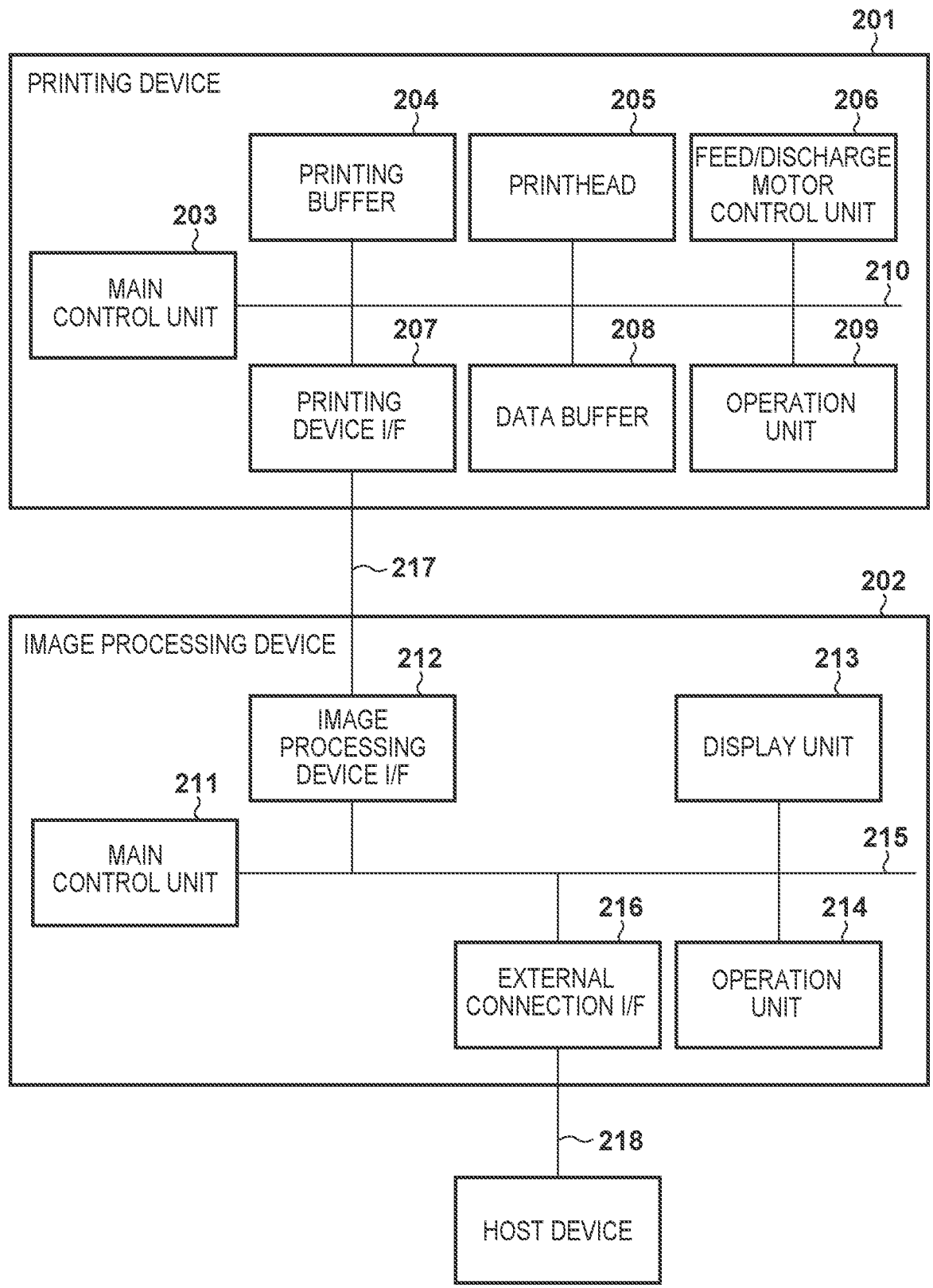
FIG. 2 is a block diagram showing the arrangement of a printer.

FIG. 2 is a block diagram showing an example of the arrangement of the printer 101. The printer 101 includes a printing device 201 and an image processing device 202. Image data supplied from the host device undergoes predetermined image processing by the image processing device 202, and is then sent to the printing device 201 and printed on a print medium. The host device indicates, for example, the cloud server 108, but may be the portable terminal 106 or the PC 103 connected wirelessly or via a wire.

In the printing device 201, a main control unit 203 controls the overall printing device 201 and includes a CPU, a ROM, and a RAM. A printing buffer 204 stores, as raster data, image data before transfer to a printhead 205. The printhead 205 is an inkjet-type printhead including a plurality of printing elements capable of discharging ink droplets, and discharges ink droplets from each printing element onto a print medium based on the image data stored in the printing buffer 204. For example, printing element arrays of four colors including cyan, magenta, yellow, and black are arranged on the printhead 205. However, the number of colors is not limited to this. For example, printing element arrays corresponding to light cyan, light magenta, and gray in addition to the above four colors may be arranged. Printing elements of red, green, and blue inks as spot color inks and fluorescent color inks may be arranged. In addition, printing element arrays corresponding to silver ink, emboss ink, and clear ink, which have functions other than colors, may be arranged. The printhead 205 may be formed by printing element arrays corresponding to colors the number of which is smaller than four, and may be formed by printing elements corresponding to a single black color.

In this embodiment, it is possible to prevent such a situation that if the amount of data accumulated in the printing buffer 204 is smaller than the amount of data processed by the printhead 205, the operation of the printhead 205 stops, resulting in unevenness. As a reason for the small amount of data, while an operation of accumulating data in the printing buffer 204 and an operation of scanning the printhead 205 are simultaneously performed (simultaneous operation), the former operation is delayed with respect to the latter operation. If the page spooling capacity of the printing buffer 204 is smaller than image data for one page, a print operation cannot be performed after accumulating data for one page, and thus the above-described simultaneous operation is performed. That is, by performing the simultaneous operation, it is possible to decrease the page spooling capacity of the printing buffer 204, thereby reducing the cost. Even if the page spooling capacity of the printing buffer 204 is equal to or more than a capacity of one page, if jobs are accepted from a plurality of users, a shortage of the capacity may occur, and thus the simultaneous operation is performed. In addition, the simultaneous operation may be performed to prevent a decrease in throughput. As described above, in the arrangement in which the simultaneous operation is performed, a shortage of the data amount may occur.

A feed/discharge motor control unit 206 controls conveyance and feed/discharge of a print medium and controls the position of the print medium such that an ink droplet discharged from the printhead 205 lands at a correct position on the print medium. The feed/discharge motor control unit 206 executes the start/stop operation of a motor in accordance with the nozzle driving configuration of the printhead 205 such as a multi-pass configuration.

A printing device interface (I/F) 207 transmits/receives data signals to/from the image processing device 202. An I/F signal line 217 connects the printing device 201 and the image processing device 202. As for the type of I/F signal line 217, for example, an I/F signal line complying with specifications of Centronics can be applied. A data buffer 208 temporarily stores image data received from the image processing device 202. An operation unit 209 includes an arrangement configured to accept a command operation by an administrator. A system bus 210 communicably connects the functional blocks of the printing device 201.

On the other hand, in the image processing device 202, a main control unit 211 controls the respective units to generate image data that can be printed by the printing device 201 by performing various kinds of image processes for image data transmitted from the cloud server 108. The main control unit 211 includes a CPU, a ROM, and a RAM. A lookup table and matrix to be used in image processing are stored in advance in the ROM of the main control unit 211 for each type of print medium or each print mode (a high-resolution mode or the like). An image processing device interface (I/F) 212 transmits/receives data signals to/from the printing device 201. An external connection interface (I/F) 216 transmits/receives image data or the like to/from the host device such as the cloud server 108 externally connected via an I/F signal line 218. A display unit 213 can display various kinds of information to the user, and is formed by, for example, a Liquid Crystal Display (LCD). An operation unit 214 can accept a command operation from the user, and is formed by, for example, a keyboard and a mouse. A system bus 215 communicably connects the functional blocks of the image processing device 202.

Figure 3:
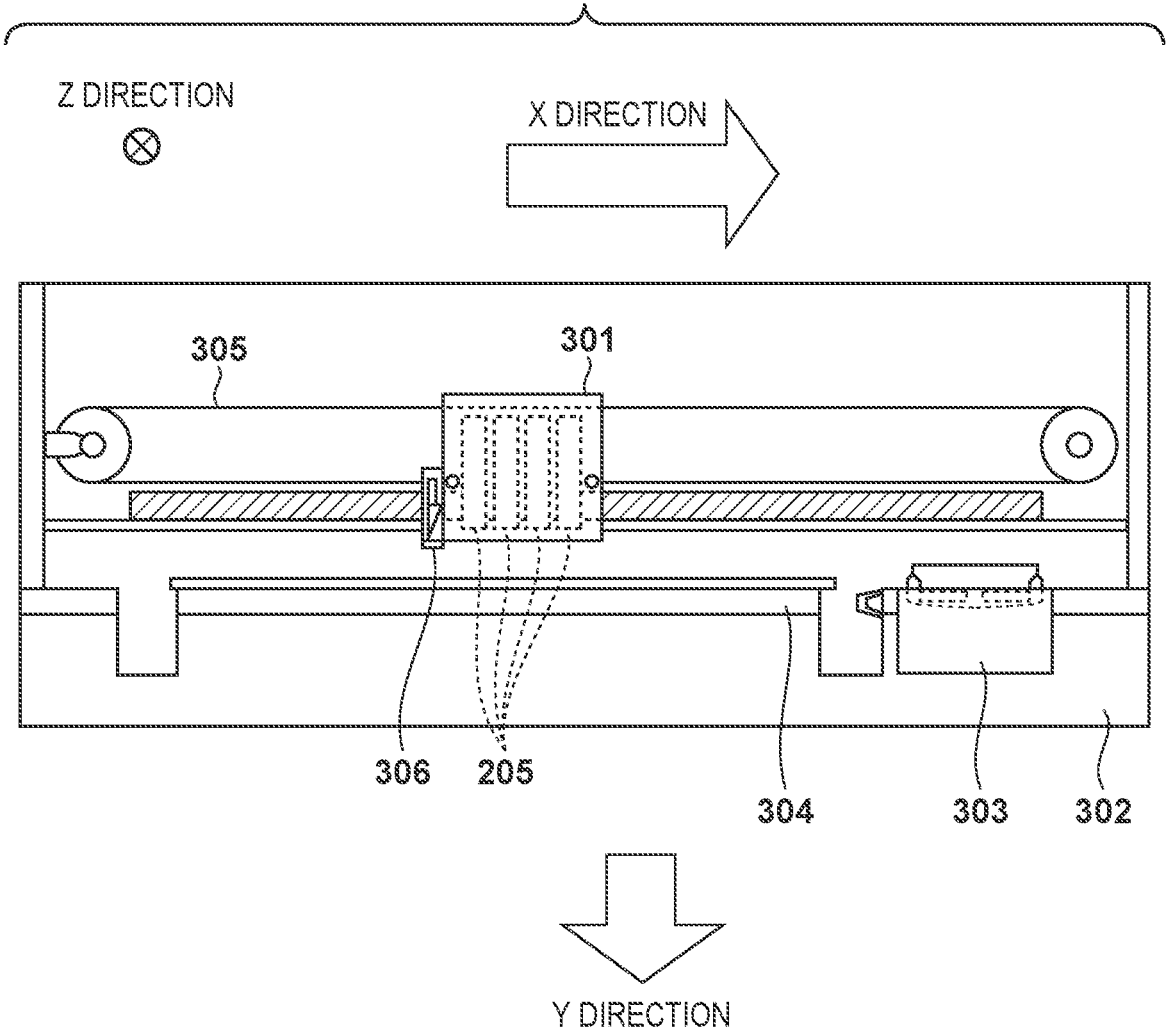
FIG. 3 is a view showing an arrangement on the periphery of a printhead.

FIG. 3 is a side sectional view of the printer 101 for explaining the arrangement on the periphery of the printhead 205. A carriage 301 on which an optical sensor 306 and the printhead 205 with nozzles, the number of which is equal to the number of colors, are mounted is configured to be movable reciprocally in the X direction in FIG. 3 by the driving force of a carriage motor transmitted via a belt 305. When the printhead 205 discharges ink in the Z direction perpendicular to the drawing surface in FIG. 3 based on print data while the carriage 301 moves in the X direction with respect to the print medium, an image for one scan is printed on the print medium arranged on a platen 304. Upon the end of one print scan, the print medium is conveyed in the Y direction (conveyance direction) intersecting the X direction in FIG. 3 by a distance corresponding to the print width of one scan. When the print scan and the conveyance operation are alternately repeated a plurality of times, the image is gradually formed on the print medium.

The optical sensor 306 performs a print medium detection operation while moving together with the carriage 301. This determines whether the print medium exists on the platen 304. At a position deviating from the platen 304 in the scan region of the carriage 301, a recovery mechanism for performing maintenance processing of the printhead 205 is formed.

If the operation of the carriage 301 unexpectedly stops during the ink discharge operation of the printhead 205, unevenness occurs due to a difference in landing time of ink discharged onto the print medium. The unevenness causes an image failure. An example of the cause for stopping the operation of the carriage 301 is that data of an amount corresponding to an ink discharge amount by the printhead 205 scanning in the X direction are not stored in the printing buffer 204. As the cause of a shortage of the data amount of the printing buffer 204, a shortage of the data amount of the data buffer 208, which is received from the image processing device 202, is considered. Then, as the cause of a shortage of the data amount of the data buffer 208, it is considered that the transfer rate of data transmitted from the cloud server 108 via the I/F signal line 218 is lower than a rate required by the print operation of the printhead 205. According to this embodiment, it is possible to prevent the occurrence of the above-described image failure by preventing a decrease in data transfer rate from the cloud server 108.

Figure 19:
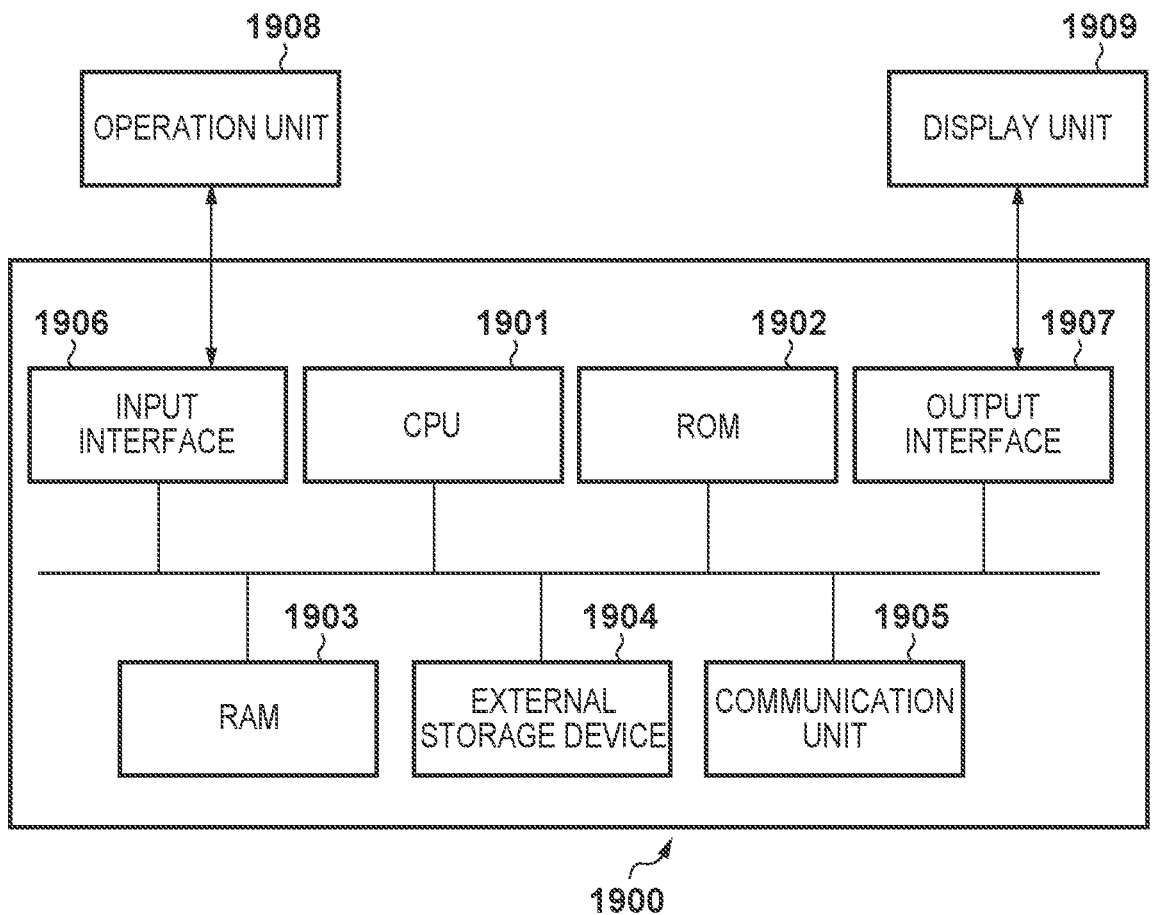
FIG. 19 is a block diagram showing the arrangement of an information processing apparatus.

FIG. 19 is a block diagram showing an example of the arrangement of each of the PC 103, the server 108, and the portable terminal 106. The PC 103, the server 108, and the portable terminal 106 will collectively be referred to as an information processing apparatus 1900 hereinafter.

The information processing apparatus 1900 includes an input interface 1906, a CPU 1901, a ROM 1902, a RAM 1903, an external storage device 1904, an output interface 1907, a display unit 1909, an operation unit 1908, and a communication unit 1905. The CPU 1901, the ROM 1902, the RAM 1903, and the like form the computer of the information processing apparatus 1900 for executing a program.

The input interface 1906 is an interface configured to accept a data input and an operation instruction from the user when the operation unit 1908 such as a keyboard is operated. Note that the operation unit 1908 may be a physical keyboard, a physical button, or the like or may be a software keyboard, a software button, or the like displayed on the display unit 1909. That is, the input interface 1906 may accept an input from the user via the display unit 1909.

The CPU 1901 is a system control unit, and controls the overall information processing apparatus 1900. The ROM 1902 stores permanent data such as control programs to be executed by the CPU 1901, data tables, and an embedded operating system (to be referred to as OS hereinafter) program. In this embodiment, the respective control programs stored in the ROM 1902 perform software execution control such as scheduling, task switch, and interrupt processing under the management of the embedded OS stored in the ROM 1902.

The RAM 1903 is formed by a Static Random Access Memory (SRAM) or the like that needs a backup power supply. Note that the RAM 1903 can store important data such as program control variables without volatilization because the data are held by a primary battery (not shown) for data backup. In addition, a memory area that stores setting information of the information processing apparatus 1900, management data of the information processing apparatus 1900, and the like is also provided in the RAM 1903. Furthermore, the RAM 1903 is used as the main memory and the work memory of the CPU 1901.

The external storage device 1904 stores various programs, applications, data, and the like. For example, if the information processing apparatus 1900 serves as the PC 103 or the portable terminal 106, a program for the setup of the printer 101 and applications is stored. If the information processing apparatus 1900 serves as the server 108, programs and applications that can be downloaded into the PC 103 or the portable terminal 106 are stored. In addition, the external storage device 1904 stores various programs such as an information transmission/reception control program for performing transmission/reception to/from an external apparatus connected via the communication unit 1905, and various kinds of information to be used by the programs.

The output interface 1907 is an interface configured to control the display unit 1909 to display data or make a notification of the state of the information processing apparatus 1900. The display unit 1909 is formed by a Light-Emitting Diode (LED), an LCD, or the like, and displays data or makes a notification of the state of the information processing apparatus 1900.

The communication unit 1905 is configured to be connected to an external apparatus such as a router to execute data communication. The communication unit 1905 may be configured to support a plurality of communication media such as wired communication and wireless communication, or a plurality of communication speeds like Wi-Fi and Bluetooth®.

The arrangement of the information processing apparatus 1900 is merely an example, and each of the PC 103, the server 108, and the portable terminal 106 has an arrangement according to functions executable by itself. For example, a camera for capturing the outside and the like may be provided.

Figure 4:
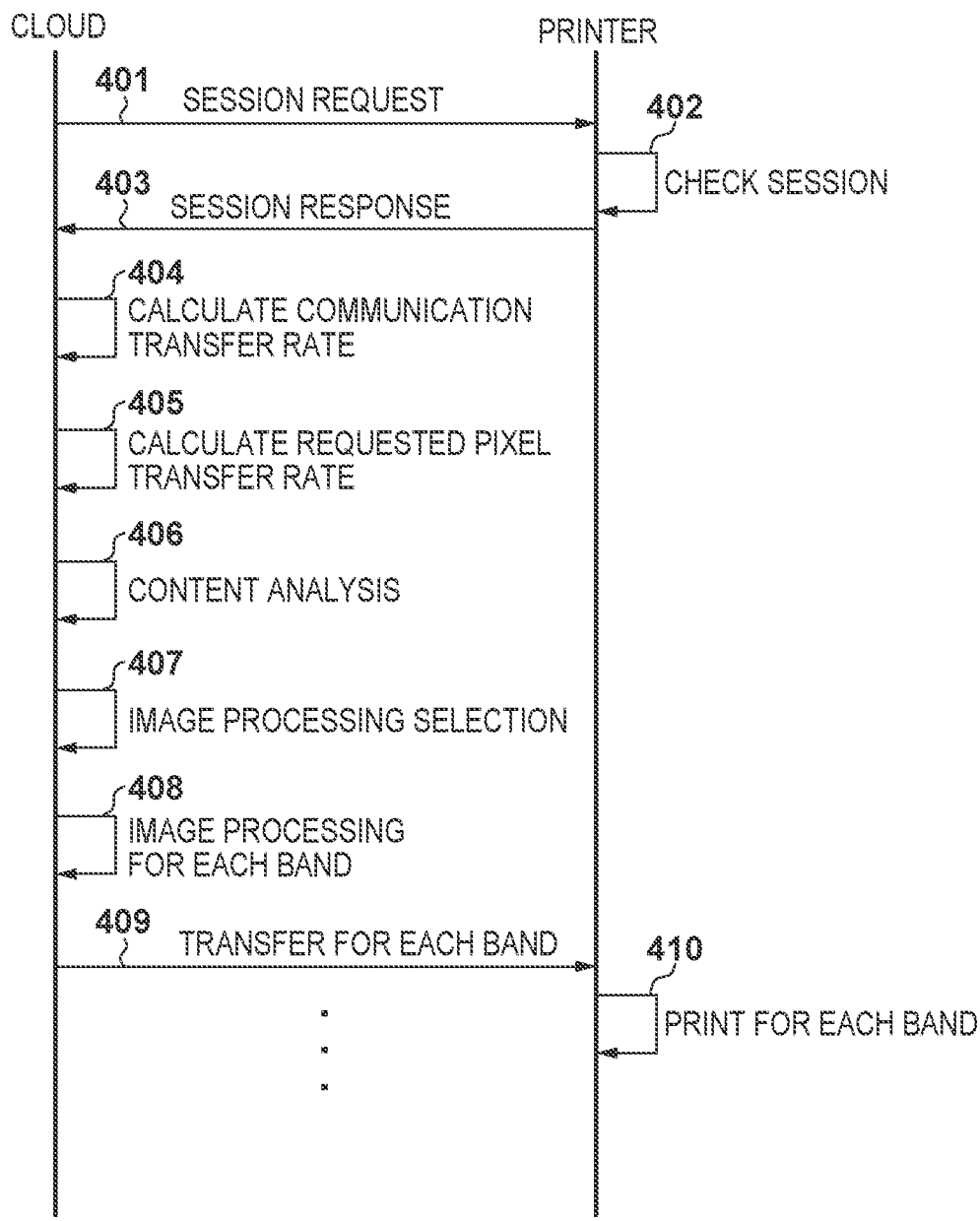
FIG. 4 is a sequence chart showing a sequence between a cloud server and a printer.

FIG. 4 is a sequence chart showing a sequence between the cloud server 108 and the printer 101. FIG. 4 shows information communicated via the I/F signal line 218 between the printer 101 and the cloud server 108 as the host device, and control in the device based on the information.

In a sequence 401, the cloud server 108 transmits a session request to the printer 101. When transmitting image data to be printed, the cloud server 108 confirms, by a session, a printer to which the image data is to be transmitted. A print instruction to the cloud server 108 can be executed by the user from the PC 103 or the portable terminal 106. Thus, a printer in which the user executes printing is designated in the print instruction. The user may operate the operation unit 214 of the printer 101 to execute a print instruction from the printer 101 to the cloud server 108. In the sequence 401, when the cloud server 108 transmits the session request to the printer 101, the cloud server 108 has recognized the transmission destination printer.

In a sequence 402, the printer 101 receives the session request, and interprets session contents. In a sequence 403, the printer 101 transmits a session response to the cloud server 108. In accordance with the session response from the printer 101, the cloud server 108 confirms the transmission destination of the image data to be printed.

In a sequence 404, the cloud server 108 calculates a communication transfer rate. Based on a communication environment between the cloud server 108 and the printer 101, the communication transfer rate at which data transfer to the printer 101 is performed is calculated. In this embodiment, when the cloud server 108 transmits a test command to the printer 101, the communication transfer rate is calculated. The user uses the portable terminal 106, the PC 103, or the printer 101 to designate printer-specific information in executing a cloud service. The printer-specific information includes a print mode, and can also include special color designation by the user. If the input of the printer 101 can accept a special color plane in addition to RGB or CMYK planes, the user can explicitly set a special color density.

The test command may be replaced with the session command transmitted for connection between the cloud server 108 and the printer 101. In this embodiment, the communication transfer rate is inferred based on the measurement result of transmission/reception of the session command in the sequences 401 to 403.

By using a time from when a request command is transmitted until a response command is returned, the communication transfer rate is calculated by:

$$\text{command transfer rate [bits/sec]} = (X+Y) \times \alpha / T \qquad (1)$$

where X represents the transmission data amount of the session command, Y represents the data amount of an ACK command returned as an ACK, T represents an elapsed time from when the session command is transmitted until the ACK command is received, and $\alpha$ represents a likelihood. The likelihood $\alpha$ is set when the transfer rate at the time of actual image data transfer may change with respect to the calculation result of the communication transfer rate. For example, there is a margin in a public line at the time of calculating the communication transfer rate, but the public line may be congested depending on the use situation of another user at the time of actual image data transfer. In this case, the likelihood $\alpha$ is set to set the communication transfer rate in consideration of congestion. The elapsed time T corresponds to a time taken for bidirectional communication between the cloud server 108 and the printer 101 but the communication transfer rate may change between upload and download. In this case as well, the change amount can be absorbed by the likelihood $\alpha$.

The communication transfer rate calculation method is not limited to the above method. For example, the likelihood $\alpha$ is multiplied by the data amount but may be added, or addition, subtraction, multiplication and division of the elapsed time T may be used. The time taken for command interpretation in the sequence 402 and generation/transmission of the response command in the sequence 403 may be subtracted from the elapsed time T. The transmission time of the session command may be acquired as a time stamp on the side of the printer 101, and then time stamp information may be transmitted as a response to the cloud server 108. The cloud server 108 may infer the communication time between the cloud server 108 and the printer 101 based on the difference between the time stamp included in the response command and the transmission time of the request command.

In a sequence 405, the cloud server 108 calculates a requested pixel transfer rate (to also be referred to as a requested transfer rate hereinafter) for preventing the stop of the operation of the printhead 205. Note that in this embodiment, the cloud server 108 calculates the requested pixel transfer rate, but the present invention is not limited to this. The printer 101 may execute processing of calculating the requested pixel transfer rate, and transmit the calculation result to the cloud server 108.

The operation condition of the printhead 205 is decided based on a print mode selected by the user. Based on condition values including a value N obtained by converting the nozzle length of the printhead 205 into the data processing resolution of the printer 101, a scan speed CR of the printhead 205, and a scan count P of the printhead 205 on the same region of the print medium, the requested pixel transfer rate is calculated by equation (2) below. The condition values corresponding to the print mode selected by the user may be held in the cloud server 108, or may be held in the printer 101 and transmitted to the cloud server 108 in the sequence 403.

$$\text{requested pixel transfer rate [pixels/sec]} = N \times CR/P \qquad (2)$$

That is, as the nozzle length is longer and the operation speed until completion of printing of a region for one scan is higher, the requested pixel transfer rate is higher. If a plurality of printhead scans are performed in the same region of the print medium, the requested pixel transfer rate is lower than that for one scan. Note that calculation of the requested pixel transfer rate is not limited to the above method. For example, the correct requested pixel transfer rate may be calculated in consideration of the fact that the scan speed of the printhead 205 becomes lower as approaching the edge of the print medium or the fact that the printhead 205 moves to the recovery mechanism by crossing the edge.

In a sequence 406, the cloud server 108 executes content analysis of the image data to be printed. The image data is data to be printed by the printer 101, and is assumed to be data of bitmap information for one page with 8 bits for each of RGB in this embodiment. In this embodiment, a histogram is used for the image data for one page to determine whether the image data is photo data including a photo as a content or document data including a document as a content.

Figure 5:
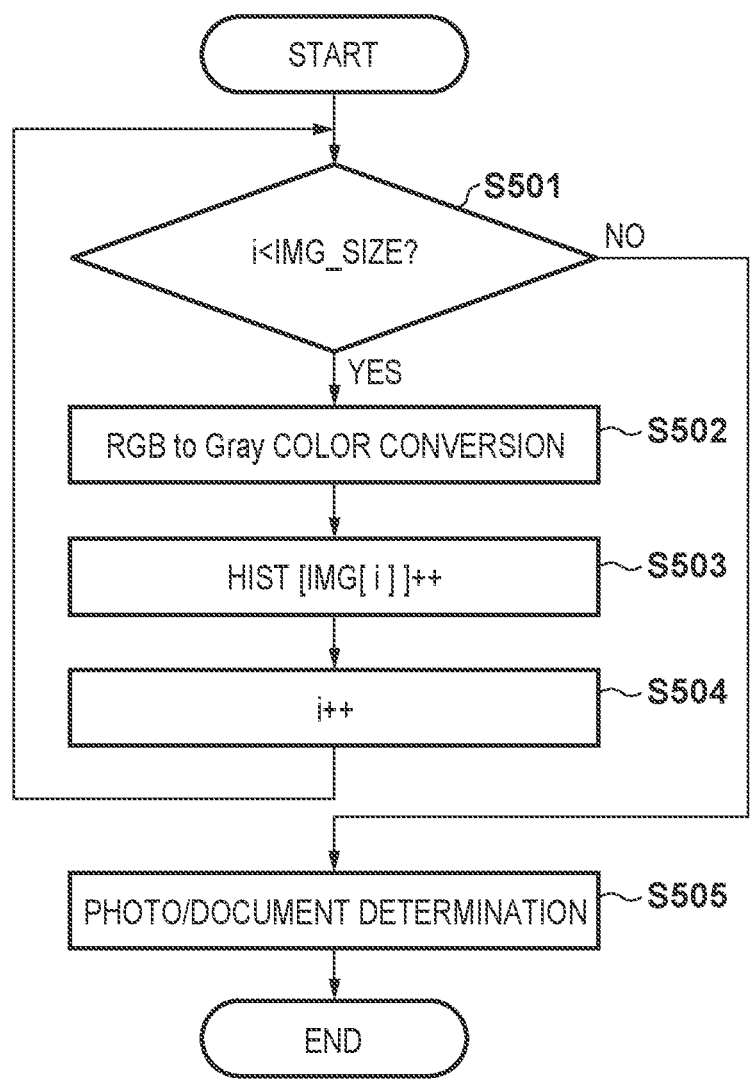
FIG. 5 is a flowchart illustrating content determination processing of a photo/document.

FIG. 5 is a flowchart illustrating content determination processing of a photo/document. The processing shown in FIG. 5 is implemented when, for example, the CPU 1901 of the cloud server 108 reads out the program stored in the ROM 1902 and executes it.

In step S501, the CPU 1901 of the cloud server 108 starts loop processing. A variable i functions as a loop counter, and is initialized to 0 when performing the loop processing. IMG_SIZE corresponds to the number of pixels for an image of one page. For example, for data of A4 size and 600 dpi, the loop processing is performed by setting IMG_SIZE to 4960 pixels×7016 pixels=34799360 pixels.

In step S502, the CPU 1901 performs gray conversion of a color image by converting the color image into a one-channel image. For example, a one-channel image is obtained by inputting RGB data and outputting luminance information Y.

In step S503, the CPU 1901 counts the ith gray pixel in a histogram. The number of elements associated by a HIST array is counted up, thereby counting the pixel in the histogram.

In step S504, the CPU 1901 counts up the loop counter i. Then, the processes in steps S502 to S504 are repeated the number of times indicated by IMG_SIZE.

If it is determined in step S501 that the processing ends for the number of pixels for the image of one page, the CPU 1901 determines, in step S505, based on the frequency information of the histogram obtained by counting the gray pixels, whether the content of the page is a photo or a document. For content determination of a photo/document, thresholds TH_LOW and TH_HIGH are used. For example, if "the total frequency of a distribution from 0 to GRAD_LOW on the histogram is smaller than TH_LOW" and "the total frequency of a distribution from GRAD_HIGH to 255" on the histogram is smaller than TH_HIGH", it is determined that the content is a photo; otherwise, it is determined that the content is a document.

FIGS. 6A and 6B are graphs each showing an example of the histogram acquired by the processing shown in FIG. 5. FIG. 6A shows a histogram when it is determined that the content of the image data to be printed is a photo. On the other hand, FIG. 6B shows a histogram when it is determined that the content of the image data to be printed is a document. The photo is considered that the pixel value gradually changes and the distribution of the histogram is not biased to the white side or the black side. Therefore, based on the characteristic of the histogram shown in FIG. 6A, it is determined that the content is a photo. On the other hand, the document is considered that the pixel values are distributed to paper white and pure black (255). Therefore, based on the characteristic of the histogram shown in FIG. 6B, it is determined that the content is a document.

This embodiment has explained that content determination of a photo/document is executed for each page by the above algorithm. However, the present invention is not limited to this. For example, in the case of PDL data, object information set by an application or OS may be added to a pixel and may thus be used. Examples of the object information are character information, line information, image information, and graphic information added to Enhanced Meta File (EMF) data as the Windows standard. Depending on the OS or application, the file structure and specifications are different and various kinds of object information are added. Instead of the histogram, an edge amount between adjacent pixels may be extracted to execute content determination of a photo/document. If an edge amount is extracted, for example, it is determined that the content is a photo when the edge amount is small, and it is determined that the content is a document when the edge amount is large.

Furthermore, the present invention is not limited to content determination of a photo/document. As a result of content analysis, a newspaper, a magazine, graphics, a chart, or the like may be determined. With respect to the result of the photo, face detection may be executed to further determine whether the photo is a portrait photo or a landscape photo. Furthermore, in addition to a person, a pet, a train, a building, and the like may be determined. The above processing may be implemented by, for example, inference processing using deep learning. With respect to the result of the document, information such as information representing that many vertical lines are included, information representing that many horizontal lines are included, or the value of the narrowest line width may be determined. The smallest number of points for characters may be determined.

One of the object information added to the image data and the result of content analysis may preferentially be used. Since the object information added to the image data reflects information at the time of capturing the image or information at the time of creating a document, accuracy higher than content analysis accuracy may be obtained. Based on the result of content analysis, "the likelihood of the content" may be evaluated, and a threshold may be provided for the evaluation value, thereby dynamically deciding whether to use the result of content analysis or the object information added to the image data.

On the other hand, since the object information added to the image data may be changed in specifications in accordance with the application or OS, content analysis may be prioritized if stable accuracy is required in the system. Alternatively, both the object information added to the image data and the result of content analysis may be used. This can execute content determination more precisely. For example, if the object information added to the image data is information of "image capturing date/time: night" and the result of content analysis is "landscape photo", "night view" can be determined by combining both the data.

In a sequence 407, the cloud server 108 selects image processing to be executed for the image data.

FIG. 7 is a table showing an example of a table for determining setting contents of image processing. FIG. 7 shows image processing executable when transmitting the image data to the printer 101, and setting contents of the image processing. In this embodiment, for each of four kinds of image processes of "JPEG compression setting", "main scanning resolution setting", "sub-scanning resolution setting", and "tone count setting", three kinds of contents can be set. The number of kinds of setting contents may be one, two, three, or more.

In each of JPEG compression setting 1 and JPEG compression setting 2, a compression Q value or sampling ratio is set, and setting contents are different depending on "setting No." For example, Q value=95 is set in JPEG compression setting 1, and Q value=90 is set in JPEG compression setting 2. The Q value is set to decide the degree of loss at the time of compression, and index the coefficient setting of a DC/AD component when performing discrete cosine transform at the time of compression. As the Q value is smaller, the file size after compression is smaller and compression loss is larger. Note that instead of the index representation as the Q value, the transform coefficient of discrete cosine transform may directly be designated.

The image data is compressed in accordance with the JPEG compression setting, and the compressed image data is transmitted from the cloud server 108 to the printer 101. As the compression effect is higher, the pixel transfer rate from the cloud server 108 to the printer 101 is higher. The data transmitted to the printer 101 is sent to the image processing device 202. The image processing main control unit 211 decodes the JPEG-compressed image data.

In each of main scanning resolution setting 1 and main scanning resolution setting 2, the resolution of the image data in the main scanning direction is set, and setting contents are different depending on "setting No." For example, resolution=300 dpi is set in main scanning resolution setting 1, and resolution=150 dpi is set in main scanning resolution setting 2. The image data undergoes resolution conversion in accordance with the main scanning resolution setting, and the converted image data is transmitted from the cloud server 108 to the printer 101. As the conversion ratio (reduction ratio) of the resolution is higher, the pixel transfer rate from the cloud server 108 to the printer 101 is higher. The data transmitted to the printer 101 is sent to the image processing device 202. The image processing main control unit 211 performs processing of expanding the reduced image data to the data processing resolution of the printer 101.

In each of sub-scanning resolution setting 1 and sub-scanning resolution setting 2, the resolution of the image data in the sub-scanning direction is set, and setting contents are different depending on "setting No." For example, resolution=300 dpi is set in sub-scanning resolution setting 1, and resolution=150 dpi is set in sub-scanning resolution setting 2. As "setting No." is larger, the image data is reduced, and the reduced image is transmitted from the cloud server 108 to the printer 101. As the conversion ratio of the resolution is higher, the pixel transfer rate from the cloud server 108 to the printer 101 is higher. The data transmitted to the printer 101 is sent to the image processing device 202. The image processing main control unit 211 performs processing of expanding the reduced image data to the data processing resolution of the printer 101.

In each of tone count setting 1 and tone count setting 2, the tone count of the image data is set, and setting contents are different depending on "setting No." For example, tone count=128 is set in tone count setting 1 and tone count=64 is set in tone count setting 2. That is, as "setting No." is larger, the tone count of the image data is smaller. If the tone count is set to fall within the range of 256 (0 to 255 can be expressed) to 128 (0 to 127 can be expressed), the pixel value is shifted to the left by two bit. Similarly, the tone count is decreased to fall from 256 to 64, the pixel value is shifted to the left by two bits. In accordance with the tone count setting, the tone count of the image data is changed. The image data whose tone count has been changed is transmitted from the cloud server 108 to the printer 101. As the tone count is smaller, the pixel transfer rate from the cloud server 108 to the printer 101 is higher. The data transmitted to the printer 101 is sent to the image processing device 202. If the cloud server 108 sets the tone count to 128, the image processing main control unit 211 shifts the pixel value to the right by two bit. If the cloud server 108 sets the tone count to 64, the image processing main control unit 211 shifts the pixel value to the right by two bits.

In "default" in FIG. 7, the default setting contents of each of the JPEG compression ratio, the resolution, and the tone count are set. For example, JPEG Q value=100, resolution=600 dpi, and tone count=256 are set. The data transmitted to the printer 101 is sent to the image processing device 202. The image processing main control unit 211 decodes the JPEG-compressed image data.

FIGS. 8A and 8B are tables each showing a priority table for determining, in a priority order, sets of setting contents of image processing with respect to the content determination result of a photo/document for each page. If it is determined that the content of the image data is a document, tone count setting 1 is applied in the set of setting contents with a priority level immediately below the priority level of the default in accordance with the table shown in FIG. 8B. As the priority level is lower, tone count setting 2 or 1 and the setting contents of the image processing to be applied are changed. Although not shown, main scanning resolution setting 1 and the setting contents of the image processing to be applied are further changed. In the set of setting contents with the lowest priority level, JPEG compression setting 2, main scanning resolution setting 2, sub-scanning resolution setting 2, and tone count setting 2 are applied. Selection of the set of the setting contents with a specific priority level to be used will be described with reference to FIG. 9.

As shown in FIGS. 8A and 8B, a priority level is set for each set of setting contents of the plurality of image processes (JPEG compression to tone number setting). In other words, if a combination of setting contents of the plurality of processes of JPEG compression to tone count setting is set as one image processing, it can be said that a priority level is set for each of the plurality of image processes.

The priority level of the image processing in FIGS. 8A and 8B is set higher for the set of setting contents with which a lower degree of deterioration of image quality is obtained when executing the image processing. In the set of setting contents with the lowest priority level, setting contents for reducing the data size are applied with respect to the plurality of image processes, and thus the degree of deterioration of image quality is high.

In this embodiment, as shown in FIGS. 8A and 8B, the priority setting of the image processing is made for each of the document and the photo each of which is the content determination result. If, for example, it is determined that the content of the image data is a photo, JPEG compression setting 1 is applied in the set of the setting contents with a priority level immediately below the priority level of the default in accordance with the table shown in FIG. 8A.

Note that the priority table setting according to the content determination result of a photo/document is not limited to the photo or document. A priority table may be set for another content determination result such as a newspaper, a magazine, graphics, or a chart. For example, with respect to the result of determining that the content of the image data is a document, a priority table may be set for the determination result representing that many vertical lines are included, that many horizontal lines are included, or the narrowest line width. In this case, for example, the priority of the setting contents of the main scanning resolution and sub-scanning resolution may be decided using information concerning a line.

FIG. 9 is a flowchart illustrating processing of selecting image processing in accordance with the priority table setting shown in FIG. 8A or 8B. The processing shown in FIG. 9 is implemented when, for example, the CPU 1901 of the cloud server 108 reads out the program stored in the ROM 1902 and executes it.

In step S901, the CPU 1901 of the cloud server 108 starts loop processing. A variable j functions as a loop counter, and is initialized to 0 when performing the loop processing. IP_SELECT corresponds to the number of selectable patterns of the image processes shown in FIG. 8A or 8B.

In step S902, the CPU 1901 substitutes the value of the loop counter j into a setting register C. The setting register C is initialized to 0 in advance when performing the loop processing.

In step S903, the CPU 1901 attempts to execute image processing with the jth priority level of the table associated with the determined content information. Note that the image processing indicates the set of the setting contents of the plurality of processes (JPEG compression to tone count setting) associated with the priority level in the priority table. If, for example, the content determination result is a document and priority level j=1, JPEG compression is executed by setting main scanning resolution=600 dpi, sub-scanning resolution=600 dpi, tone count=256, and JPEG Q value=100 in accordance with the priority table shown in FIG. 8B.

In step S904, the CPU calculates the pixel transfer rate based on the communication transfer rate calculated by equation (1) and the image size after the attempt of the image processing in step S903. First, if the image size after the attempt of the image processing is represented by IMG_DATA, and the communication transfer rate is represented by DATA_RATE, a time IMG_TIME taken to transfer the image is calculated by:

$$IMG\_TIME = IMG\_DATA/DATA\_RATE \qquad (3)$$

Note that the method of calculating the transfer time is not limited to this. For example, a transmission packet may include head data or error correction parity data in addition to the image data. In this case, a data amount concerning communication may be added to IMG_DATA. This can improve the inference accuracy.

To calculate the pixel transfer rate, the transfer time IMG_TIME and the image size calculated from the data processing resolution of the printhead 205 are calculated. The purpose of using the data processing resolution of the printhead 205 is to perform comparison with the requested pixel transfer rate. Assume that H represents the number of pixels in the vertical direction of the image before the attempt of execution of the image processing in step S903, W represents the number of pixels in the horizontal direction, D1 represents the resolution, and D2 represents the data processing resolution of the printhead 205. The image size calculated from the data processing resolution of the printhead 205 is calculated by:

$$IMG\_PRINT\_DATA = H \times W \times (D2/D1)^2 \quad (4)$$

Note that in equation (4), the same resolution is set in the vertical and horizontal directions of the image.

Using the image size IMG_PRINT_DATA and the transfer time IMG_TIME, the pixel transfer rate is calculated by:

$$\text{pixel transfer rate [pixels/sec]} = IMG\_PRINT\_DATA / IMG\_TIME \quad (5)$$

Note that the image size IMG_PRINT_DATA may be calculated from one image or calculated based on the height corresponding to the nozzle length of the printhead 205. Alternatively, the image size IMG_PRINT_DATA may be calculated based on a designated band region or rectangular region. Note that the transfer time IMG_TIME needs to be a time taken for an image region designated by the image size IMG_PRINT_DATA.

In step S905, the CPU 1901 compares the pixel transfer rate calculated in step S904 with the requested pixel transfer rate calculated in the sequence 405. If the pixel transfer rate is equal to or higher than the requested pixel transfer rate, the process advances to step S907; otherwise, the process advances to step S906. Note that to perform the comparison processing in step S905, the data amount stored in the printing buffer 204 or the data buffer 208 may be used. As long as data are accumulated in the buffer of the main body of the printer 101, the carriage 301 never stops at the time of discharging of the printhead 205, and it is thus possible to improve the possibility of avoiding stopping the carriage 301 by using the data amount.

In step S906, the CPU 1901 counts up the loop counter j. The processes in steps S902 to S906 are repeated the number of times indicated by IP_SELECT.

On the other hand, in step S907, the CPU 1901 selects, as image processing to actually be executed for the image data, the image processing of interest, that is, the set of the setting contents with reference to the value of the setting register C.

Referring back to FIG. 4, in a sequence 408 shown in FIG. 4, the cloud server 108 executes image processing for each band by the image processing selected in the processing shown in FIG. 9. In a sequence 409, the cloud server 108 transfers, to the printer 101, the image data having undergone the image processing. In a sequence 410, the printer 101 receives the image data from the cloud server 108. The printer 101 receives the image data via the external connection I/F 216. If the data is compressed, the main control unit 211 performs decompression processing. The main control unit 211 converts the decompressed data into a color plane corresponding to the ink mounted on the printer 101. The main control unit 211 converts the color plane into dot data for discharging by the printhead 205. The dot data is stored in the printing buffer 204, and the contents in the printing buffer 204 are read out in synchronism with the scan operation of the printhead 205, thereby executing printing on the print medium.

As described above, according to this embodiment, the cloud server 108 can select and execute the image processing so as to obtain the pixel transfer rate equal to or higher than the requested pixel transfer rate on the side of the printer 101. With respect to deterioration of image quality caused by executing the image processing for compressing the size, it is possible to suppress the degree of deterioration of the image caused by executing the image processing for compressing the size by holding, in advance, the priority information of the image processing corresponding to the content determination result.

Second Embodiment

In the second embodiment, the difference from the first embodiment will be described below. In the first embodiment, the image processing selected by the processing shown in FIG. 9 is executed, and the image data obtained after the execution is transmitted from the cloud server 108 to the printer 101. Then, on the side of the printer 101, the main control unit 211 executes data decompression, color plane conversion, and dot data conversion.

Note that the cloud server 108 can generate dot data, and then transmit the data to the printer 101. As the dot data, information from binary information indicating "discharge" or "non-discharge" of dots to multivalued information indicating "the number of droplets to be discharged" can be processed. Since the dot data often has a data amount smaller than that of RGB multivalued data information independent of the printer, the communication efficiency is improved. On the other hand, if lossless compression is executed for the dot data, the discharge amount and discharge position may be corrupted, thereby causing an image failure. In this embodiment, it is possible to appropriately select image processing by including execution of conversion into dot data on a cloud server 108.

Figure 10:
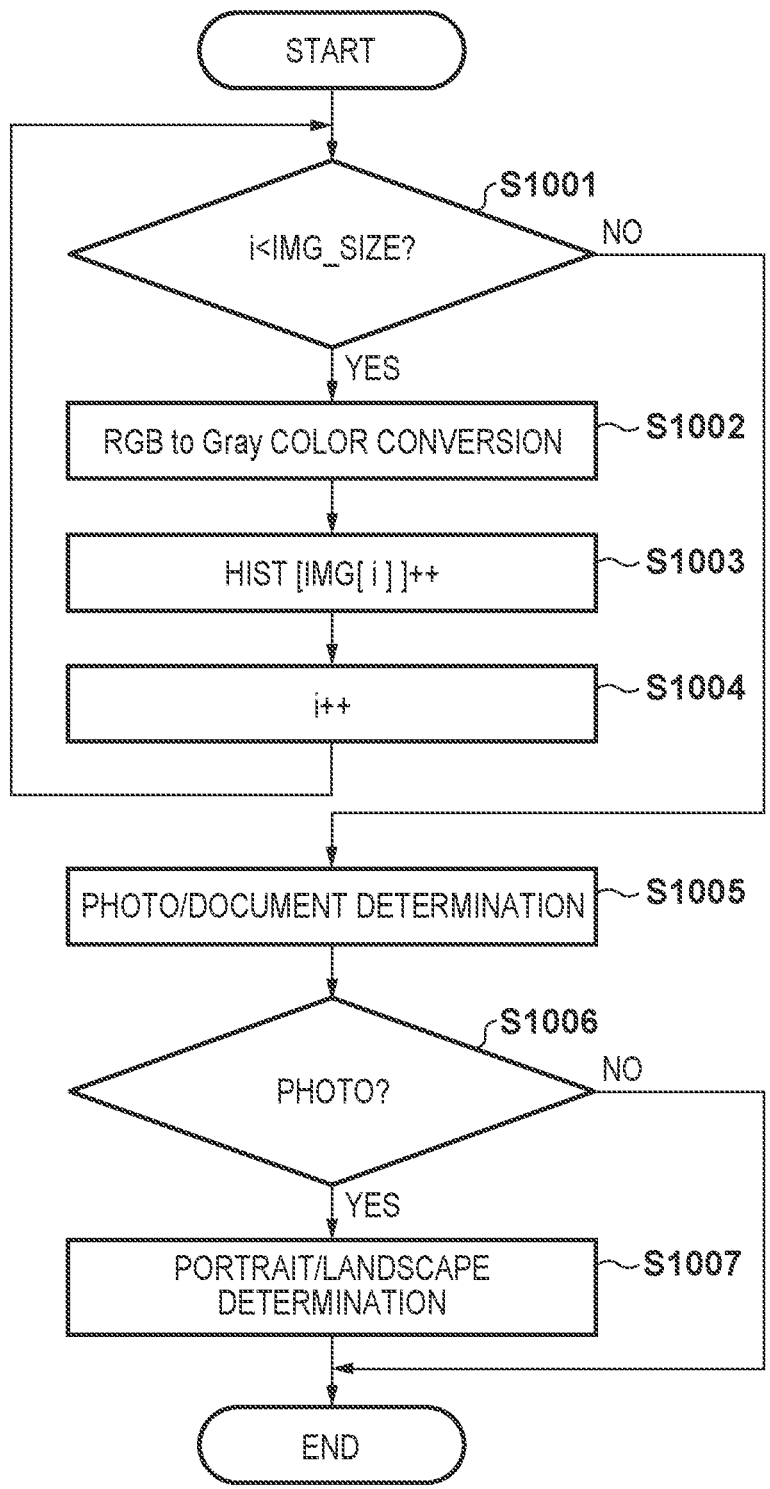
FIG. 10 is a flowchart illustrating content determination processing of a photo/document.

FIG. 10 is a flowchart illustrating content determination processing of a photo/document according to this embodiment. The processing shown in FIG. 10 is implemented when, for example, a CPU 1901 of the cloud server 108 reads out a program stored in a ROM 1902 and executes it.

Steps S1001 to S1005 are the same as steps S501 to S505 of FIG. 5 and a description thereof will be omitted. In step S1006, the CPU 1901 determines, as a result of content determination processing in step S1005, whether the content is a photo. If it is determined that the content is "photo", the process advances to step S1007. On the other hand, if it is determined that the content is not a photo, for example, the content is a document, the processing shown in FIG. 10 ends.

In step S1007, the CPU 1901 further determines whether the content is a portrait photo or a landscape photo. For the determination processing in step S1007, face detection is used. That is, if a face is detected on the image, a portrait photo is determined; otherwise, a landscape photo is determined. At this time, various kinds of methods may be used in accordance with determination accuracy. For example, if the size of the detected face is equal to or larger than a given value, a portrait photo may be determined; otherwise, a landscape photo may be determined. Based on the size of the face, it may be determined whether the detected face is a main object. Based on the direction of a face, the number of faces, and the reliability of face detection in addition to the size of a face, a portrait photo may be determined. Individual recognition using a specific face dictionary may be used. If a face registered in the face dictionary is captured, it may be determined that the person is a main object of the photo. The recognition reliability of individual recognition and the frequency of registration in the face dictionary may be used. For example, with respect to an object often registered in the face dictionary, a person may be determined regardless of the face size at the time of detecting the face.

FIG. 11 is a table showing an example of a table for determining setting contents of image processing according to this embodiment. FIG. 11 shows image processing that can be executed when transmitting image data to a printer 101, and the setting contents of the image processing. In this embodiment, for each of six kinds of image processes of "JPEG compression setting", "main scanning resolution setting", "sub-scanning resolution setting", "tone count setting", "dot data conversion setting", and "color count setting", four kinds of contents can be set. Note that the number of kinds of setting contents is not limited to four, and may be smaller or larger than four.

In each of dot data conversion setting 1 and dot data conversion setting 2, a tone count when converting input RGB data into dot data is set, and setting contents are different depending on "setting No." The default setting contents are setting contents for performing conversion into four-bit data of zero to 15 per pixel with respect to the output resolution. Dot data conversion setting 1 includes setting contents for performing conversion into three-bit data of zero to seven per pixel with respect to the output resolution. Dot data conversion setting 2 includes setting contents for performing conversion into two-bit data of zero to three per pixel with respect to the output resolution.

In each of color count setting 1 and color count setting 2, a color count when converting input RGB data into dot data is set, and setting contents are different depending on "setting No." The default setting contents are setting contents for performing conversion into six colors of cyan, magenta, yellow, black, light cyan, and light magenta. Color count setting 1 includes setting contents for performing conversion into five colors of cyan, magenta, yellow, black, and light cyan. Color count setting 2 includes setting contents for performing conversion into four colors of cyan, magenta, yellow, and black.

In other words, in the table shown in FIG. 11, both "image processing for RGB information before conversion into dot data" and "image processing when performing conversion into dot data" are described. Referring to FIG. 11, if, among the plurality of image processes, there is a combination of image processes that cannot be executed simultaneously, "non-execution" can be set. For example, if JPEG compression is performed after executing dot data conversion, the number of dots and their positions may change, thereby causing an image failure. Therefore, if dot data conversion is executed, "non-execution" is set for JPEG compression. With respect to dot data conversion and color count setting, "non-execution" can be set. In this case, a main control unit 211 of the main body of the printer 101 executes conversion processing into dot data. Setting contents when performing conversion into dot data in the main body of the printer 101 are the same as the "default" setting contents. Note that the main scanning resolution and sub-scanning resolution are image processes that can be combined with other remaining image processes, and thus the setting of "non-execution" is not expected for the image processes in FIG. 11.

With respect to the image processing that can be combined with another image processing and the image processing that cannot be combined with another image processing, for example, two-stage selection processing may be executed. Selection processing of the first stage is provided to select whether the cloud server 108 executes processing for RGB data or performs conversion into dot data and then performs the processing for the dot data. Then, as the second stage, image processing is selected. An example of processing of selecting one of dot data and RGB data as the processing target in the cloud server 108 and then selecting specific image processing will be described with reference to FIG. 18.

Figure 18:
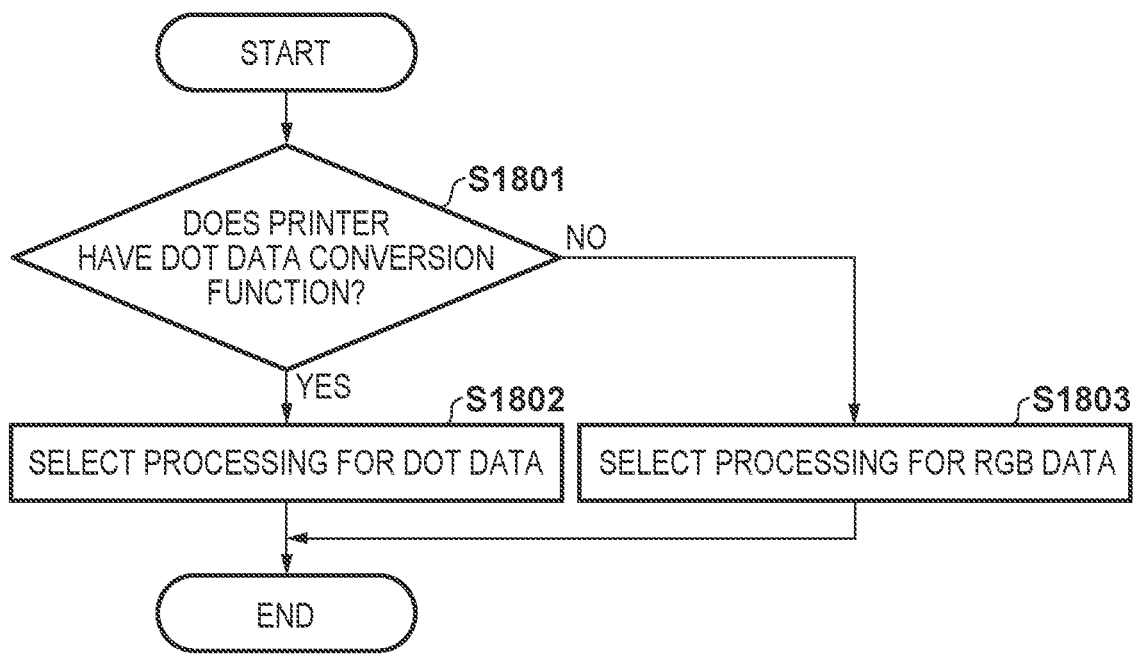
FIG. 18 is a flowchart illustrating processing of selecting image processing.

FIG. 18 is a flowchart illustrating processing of selecting one of dot data and RGB data as a processing target in the cloud server 108 and then selecting specific image processing. The processing shown in FIG. 18 is implemented when, for example, the CPU 1901 of the cloud server 108 reads out a program stored in the ROM 1902 and executes it. The processing shown in FIG. 18 is executed in the sequence 407 of FIG. 4.

In step S1801, the CPU 1901 of the cloud server 108 determines whether the printer 101 as a communication destination has a dot data conversion function. The cloud server 108 may hold the hardware function information of the printer 101, or the printer 101 may transmit the hardware function information to the cloud server 108 by a session response command at the start of a session in FIG. 4. If it is determined that the printer 101 has the dot data conversion function, the process advances to step S1802; otherwise, the process advances to step S1803.

In step S1802, the CPU 1901 selects image processing for the dot data. In this embodiment, the CPU 1901 selects image processing from "dot data conversion", "color count", "main scanning resolution", and "sub-scanning resolution". On the other hand, in step S1803, the CPU 1901 selects image processing for the RGB data. In this embodiment, the CPU 1901 selects image processing from "JPEG compression", "main scanning resolution", "sub-scanning resolution", and "tone count setting".

Referring to FIG. 18, it is determined, based on hardware information of the printer 101, whether to select image processing after selecting the dot data as a processing target or selecting the RGB data as a processing target. However, the present invention is not limited to this, and another determination condition may be used. For example, the load state of the cloud server 108, the image processing speed of the cloud server 108 and the printer 101, or the like may be used as a determination condition.

FIGS. 12A to 12C are tables each showing an example of a priority table for determining, in a priority order, sets of setting contents of image processing with respect to the content determination result for each page. FIG. 12A shows a priority table corresponding to the content determination result as a portrait photo. FIG. 12B shows a priority table corresponding to the content determination result as a landscape photo. FIG. 12C shows a priority table corresponding to the content determination result as a document. In each of FIGS. 12A to 12C, the set of setting contents for performing conversion into dot data and color count setting by default has the highest priority level. In the set, the setting contents of the main scanning resolution setting and the sub-scanning resolution setting are defaults. In other words, this means that the resolution is not reduced. That is, in the set, JPEG compression, reduction of the resolution, and change of the tone count are not performed, and thus the image does not deteriorate.

In the priority table shown in FIG. 12A, in the set of setting contents of priority level 3 or 4, JPEG compression setting 1 or 2 is applied. On the other hand, in the priority table shown in FIG. 12B, in the set of setting contents of priority level 2, color count setting 1 is applied, and in the set of setting contents of priority level 4, JPEG compression setting 1 is applied. This is done because it is important for a photo including a person as a main object to make the skin color of the person look beautiful. Therefore, it is determined that it is more important (that is, it is prioritized) to maintain light magenta of light color than the JPEG compression ratio, that is, it is more important not to decrease the color count. On the other hand, it is determined that light color is not important for the landscape photo, as compared with the portrait photo, and it is determined that it is more important (that is, it is prioritized) to decrease the color count and increase the pixel transfer rate.

The above determination criterion is merely an example, and the determination criterion may be determined appropriately in accordance with the content. That is, as a type of content, a main color component may be extracted and this information may be used. For example, for a landscape photo of, specifically, a sunset, finer tonality may be desired for a portion of a red sky. For a photo of sea, red components are hardly included and light magenta is considered unnecessary. As described above, in addition to determination of a portrait photo or a landscape photo, scene information of the image may be determined, and then a priority table may be set in accordance with a determination criterion corresponding to the determined scene information.

In the priority table shown in FIG. 12C, a set of setting contents for decreasing the data amount by decreasing the number of bits converted into dot data and also decreasing the color count is applied with a relatively high priority level. This is done because the recognizability of the document is not influenced by a little decrease in tonality, gradation is hardly formed in the document, and it is thus determined that the decrease of light color ink hardly influences image quality.

In the priority tables shown in FIGS. 12A to 12C, the processing load of the cloud server 108 may be considered in addition to the image quality. For example, the priority level of a set of setting contents including high-load processing like dot data conversion may be decreased. The priority level may dynamically be changed in accordance with the processing load of the cloud server 108 in real time. For example, if the cloud server 108 processes a plurality of jobs, selection of image processing by selecting the RGB data as a processing target may be prioritized; otherwise, selection of image processing by selecting the dot data as a processing target may be prioritized. With this arrangement, it is possible to reduce the possibility of the stop of the operation of a printhead 205 of the printer 101 caused by a delay in transmission interval for each band in the sequence 409 along with an increase in processing load of the cloud server 108. The main control unit 211 of the printer 101 may change the priority level on the side of the cloud server 108 in accordance with whether the dot data conversion function is provided as a hardware circuit.

As described above, according to this embodiment, even if the printer 101 has no dot data conversion function, it is possible to perform image processing corresponding to the function in the cloud server 108 and improve the pixel transfer rate by including dot data conversion and color count setting in the image processing. Even if the cloud server 108 performs conversion into dot data, such image processing that deteriorates in image quality is suppressed can be executed based a content determination result.

Third Embodiment

In the third embodiment, the difference from the first and second embodiments will be described below. In the first and second embodiments, analysis of content determination is performed for each page. However, in some documents, a document and a photo are mixed in a page. If it is determined that a content in a page is a document or a photo although the document and the photo are mixed, the JPEG compression ratio may become high with respect to the document in the page or the tone count may decrease with respect to the photo. This embodiment assumes a case in which a plurality of kinds of contents are mixed in a page.

If a cloud server 108 performs analysis of content determination for each page, it is assumed that the processing time is long, and a time until first printing starts in a printer 101 is late. To cope with this, in this embodiment, an image is divided into bands, and analysis of content determination is performed for each block in each band. That is, by performing analysis of content determination for each block, it is possible to transmit processed data to the printer 101 while executing image processing. As a result, it is possible to prevent the time until first printing starts in the printer 101 from being late.

Figure 13:
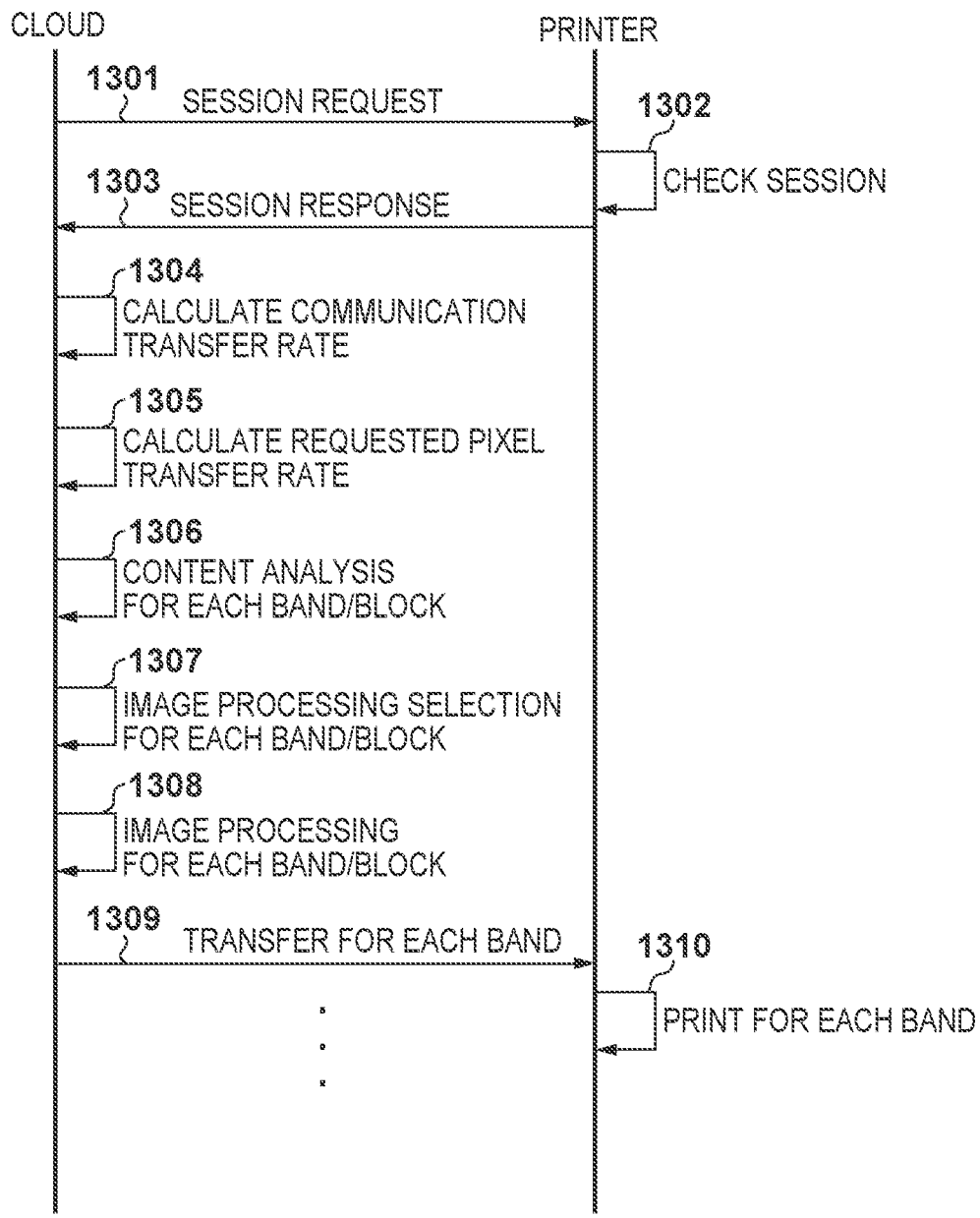
FIG. 13 is a sequence chart showing a sequence between a cloud server and a printer.

FIG. 13 is a sequence chart showing a sequence between the cloud server 108 and the printer 101 according to this embodiment. FIG. 13 shows information communicated via an I/F signal line 218 between the printer 101 and the cloud server 108 as a host device, and control in the device based on the information.

Sequences 1301 to 1305 are the same as the sequences 401 to 405 of FIG. 4 and a description thereof will be omitted.

In a sequence 1306, the cloud server 108 divides an image of image data into bands, and performs analysis of content determination for each block in each band.

In this embodiment, an image of image data is divided into bands. By dividing the image into bands, it is possible to specify a portion of a photo and a portion of a document from the state of the page including both the document and the photo.

Figure 14A:
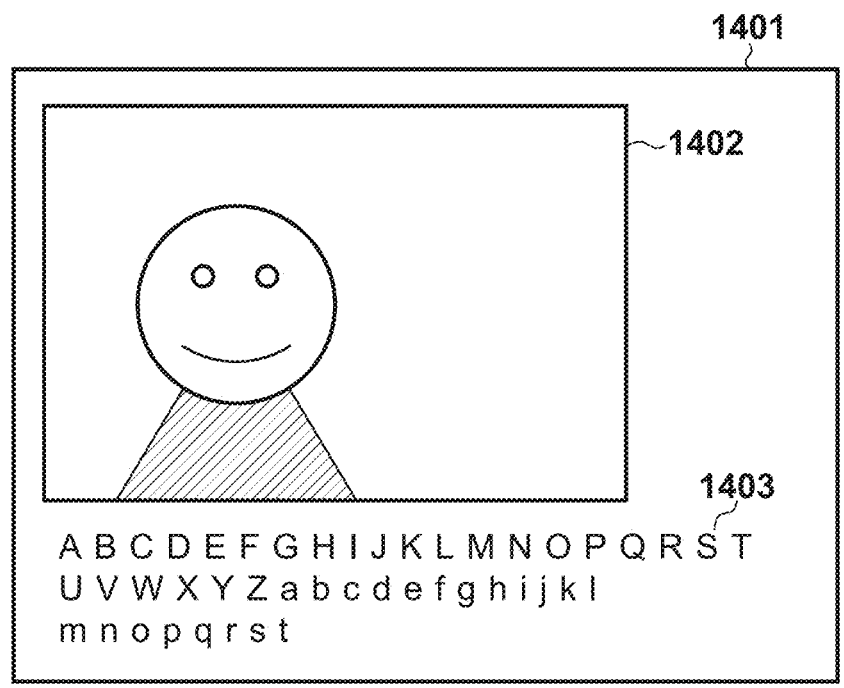
FIGS. 14A and 14B are views each showing an image in which a document and a photo are mixed.

FIG. 14A shows an example of an image including a document and a photo. That is, in an image 1401, a photo 1402 is pasted and a document 1403 is described as the caption of the photo.

Figure 14B:
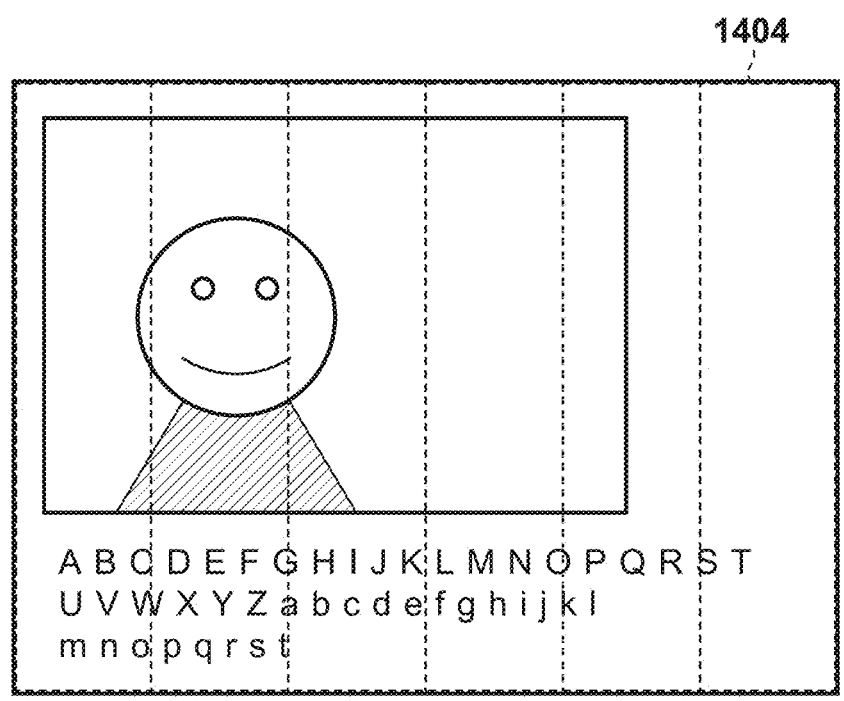
Figure 15A:
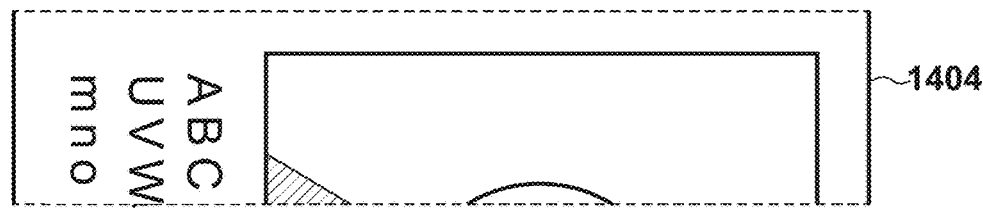
FIGS. 15A and 15B are views each showing an image of a band portion.
Figure 15B:
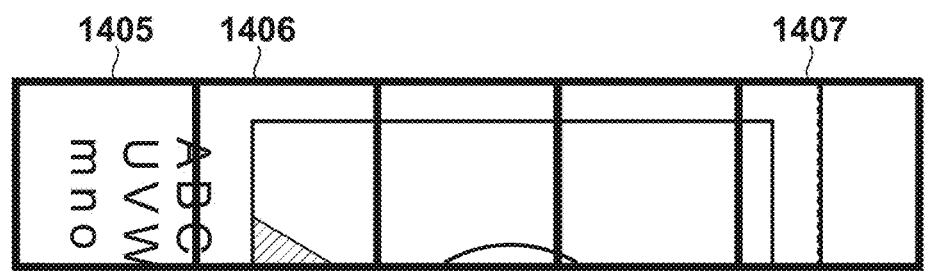

In this embodiment, to perform analysis of content determination for each band, the image is divided into bands in the same direction as the scanning direction of a printhead 205 of the printer 101. FIG. 14B shows a state in which the image 1401 is divided into vertical bands 1404. A dotted line in FIG. 14B indicates the boundary of each band. FIG. 15A shows information obtained by extracting the first band 1404. As shown in FIG. 15B, in analysis of content determination, the first band is divided by a predetermined block size. A thick frame in FIG. 15B indicates the boundary of each block. A block 1405 is the first block. A block 1407 indicates the termination block of the band. With respect to an excess region exceeding an image region, a pixel value 0 is embedded to satisfy the block size, thereby making it possible to execute common processing for each block. Note that processing performed for the excess region is not limited to the processing of embedding the pixel value 0. A designated pixel value may be embedded, or pixels in the region may be mirrored to embed the pixel values.

The block 1405 undergoes analysis of content determination by the processing shown in FIG. 5. That is, it is determined, for each block, whether the content is a photo or a document. Therefore, in this embodiment, as thresholds TH_LOW and TH_HIGH set for a histogram, thresholds for each block are set. By using a threshold calculated by a ratio with respect to the number of pixels for calculation of a histogram, the same value can be used regardless of the value of IMG_SIZE. In the case of FIG. 15B, as a result of analysis of content determination, the block 1405 is determined as a document and a block 1406 is determined as a photo.

In a sequence 1307, the cloud server 108 selects image processing for each block in the band. Based on the analysis result in the sequence 1306, image processing is selected for the block 1405 in accordance with a priority level defined in a priority table corresponding to the document. Image processing is selected for the block 1406 in accordance with a priority level defined in a priority table corresponding to the photo.

It is determined, for each band, whether the pixel transfer rate is equal to or higher than the requested pixel transfer rate of the main body of the printer 101. For example, with respect to the band 1404, image processing is selected for each of all the blocks 1405, 1406, . . . , 1407. The selected image processing is performed for each block, and the total data amount for each band is calculated for the image processing results. The total data amount for each band is substituted into IMG_DATA in equation (3), and a communication transfer rate for each band is set in DATA_RATE.

In a sequence 1308, the cloud server 108 performs image processing for each block in the band. In a sequence 1309, the cloud server 108 transfers, to the printer 101, the image data having undergone the image processing for each band. In a sequence 1310, the printer 101 receives the image data from the cloud server 108. The printer 101 receive the image data via the external connection I/F 216.

The printer 101 causes the main control unit 211 to perform processing corresponding to each block. For example, if the cloud server 108 has performed JPEG compression for the block, the main control unit 211 performs decompression processing. For example, if the cloud server 108 has performed resolution reduction processing for the block, the main control unit 211 performs resolution expansion processing.

According to this embodiment, since image processing is selected for each block region with respect to a page including a document and a photo, it is possible to suppress the degree of deterioration of an image. By selecting image processing for each band, the cloud server 108 can execute the image processing simultaneously with print processing on the side of the printer 101.

Before the start of the print operation of the printer 101, a predetermined number of bands may undergo image processing. With this arrangement, it is possible to prevent the stop of the operation of the printhead 205 caused by a delay in data transmission caused by the load of the image processing on the side of the cloud server 108 for some reason.

If the block includes a small amount of document data like the block 1406, it is considered that a slight detection error occurs for photo determination of the block 1406. With respect to, for example, a character string "ABC" crossing the blocks 1405 and 1406, if part of it is determined as a document and another part of it is determined as a photo, different image processes are selected and executed for the character information, and thus image deterioration may become conspicuous. To prevent this situation, block scanning may be superimposed.

Figure 16A:
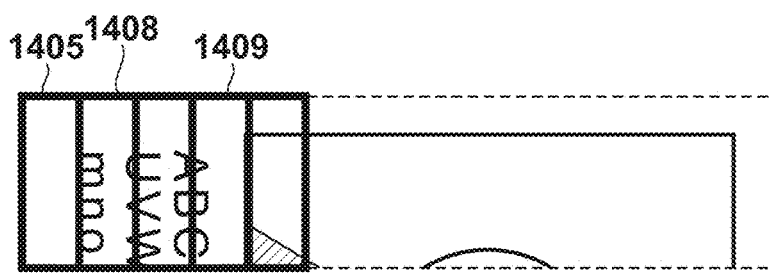
FIGS. 16A and 16B are views for explaining processing on a block basis.
Figure 16B:
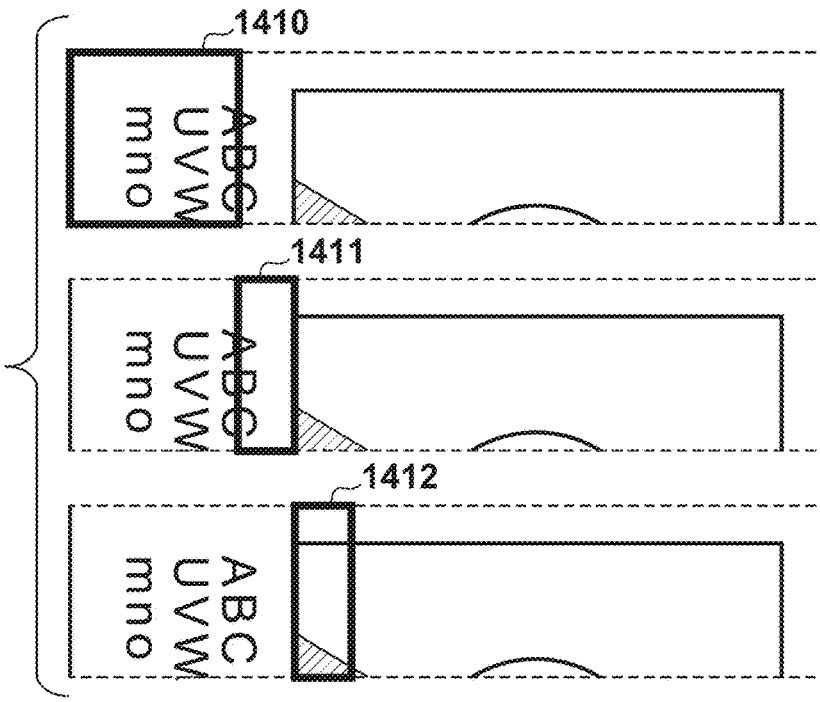

More specifically, for example, as shown in FIG. 16A, analysis of content determination of a block 1408 is performed so as to be superimposed on the block 1405. Then, analysis of content determination of a block 1409 is performed so as to be superimposed on the block 1408. That is, the processes in the sequences 1307 and 1308 are executed for a portion obtained by excluding a region superimposed on the preceding block. For example, if the blocks are superimposed on each other, as shown in FIG. 16A, an image processing region reflecting the analysis result of the block 1405 is a block 1410 shown in FIG. 16B. Similarly, an image processing region reflecting the analysis result of the block 1408 is a block 1411, and an image processing region reflecting the analysis result of the block 1409 is a block 1412.

Whether it is possible to execute the above processing of superimposing the blocks may be selectable based on the content determination accuracy and the image processing efficiency. For example, this may dynamically be set for each print mode or each job.

Fourth Embodiment

In the fourth embodiment, the difference from the first to third embodiments will be described below. In the first to third embodiments, the communication transfer rate is calculated in the sequence 404 based on the session command in the sequences 401 to 403 of FIG. 4. The arrangement using the session request and the session response is an example of an arrangement for inferring the communication transfer rate.

Depending on a time lag between a timing of executing a session and a timing of sending image data to a printer 101, the inferred communication time may change. For example, in a time period during which the public line is busy, a time taken to transmit image data may be longer than the inferred communication time. In addition to whether the communication band is busy, the climate may have an influence. Communication with a wireless base station may be influenced by rain or a change in humidity. Even in a wired environment, a communication cable may be exposed to rain and swing, thereby causing transmission loss. In the case of transmission loss, generation of a retransmission request may make the communication time longer than usual. Furthermore, if another apparatus in the same LAN in a LAN environment at home or office is busy, interference may increase in a wireless environment. In this case, it may be impossible to absorb a change amount by a likelihood α. To cope with this, in this embodiment, to infer the communication transfer rate, communication history information at the time of printing, which is accumulated in a cloud server 108, is used.

FIG. 17 is a table showing an example of a communication history table at the time of printing accumulated in the cloud server 108. In a sequence 404, the cloud server 108 infers the communication transfer rate using the communication history table.

The communication history table at the time of printing shown in FIG. 17 shows a status in a communication time period at the time of executing printing. History No. 1 will be exemplified. History No. 1 shows a history indicating that the cloud server 108 communicates with a printer installed in a region A in a time period of 12:00 to 14:00. As shown in FIG. 17, information indicating that the climate at this time is rainy and information indicating that the humidity is high are also recorded. Then, a communication transfer rate [bits/sec] as an actually measured value is recorded. The communication history is successively recorded in the communication history table shown in FIG. 17.

In FIG. 17, a communication history is acquired by setting a communication time period to 2 hours. However, the present invention is not limited to this, and a communication history may be acquired at a shorter time interval. A region range may be set wider or narrower. In addition to the climate and humidity, the use status of an electrical apparatus on the periphery of the printer may be recorded.

The number of routing hops at the time of communication may be acquired. For example, in history No. 1, routing from the cloud server 108 to the printer in the region A is acquired. This can record a line used from the cloud server 108 to a router connected to the server, a line and the number of hops used from the router to a router 102 connected to the printer 101, and a line used from the router 102 to the printer 101. With this acquired information, it is possible to increase the rate calculation accuracy to infer the communication transfer rate. As a communication history, a record result indicating whether the operation of the printhead stops at the time of printing may be recorded. The record result of the operation of the printhead may be acquired by the printer 101, transmitted to the cloud server 108, and then recorded as a communication history.

When calculating the communication transfer rate, a CPU 1901 of the cloud server 108 refers to the communication history table shown in FIG. 17 to acquire a communication history similar in situation to printing to be executed. For example, if, when executing printing, the printer 101 is installed in a region "C", the climate is "cloudy", the humidity is "intermediate", and the communication time is "11:00", history No. 3 is similar in the communication history table shown in FIG. 17. Therefore, the CPU 1901 of the cloud server 108 refers to the communication history table to infer that the communication transfer rate "bits/sec" is 200 [bits/sec]. At this time, similar to the first embodiment, the likelihood α may be used to absorb the change amount from the inference result.

There is a case in which there is no communication history completely matching the printing status even if the communication history table is referred to. In this case, a communication history including closest contents is referred to. For example, the priority level of the item of each column of the communication history table may be set. Assume, for example, that when executing printing, the printer is installed in a region "B", the climate is "sunny", the humidity is "high", and the communication time is "14:00". In this case, the environment is similar to history No. 2 and history No. 4. On the other hand, the priority levels of the items of the respective columns of the table are set higher in the order of "region", "communication time", "climate", and "humidity". Then, the climate is prioritized over the humidity, thereby determining that the printing status is similar to history No. 2.

There is a case in which a plurality of communication histories completely match the printing status. In this case, an average value or lower limit value may be obtained as the communication transfer rate based on the plurality of communication histories. Assume, for example, that when executing printing, the printer is installed in a region "D", the climate is "rainy", the humidity is "high", and the communication time is "12:00". The environment is similar to history No. 8 and history No. 10. In this case, as the communication transfer rate, 55 [bits/sec] as the average value of the communication transfer rates of the histories or 50 [bits/sec] as the lower limit value may be set. The lower limit value may be adopted. In this case, it is possible to acquire the safer communication transfer rate for preventing the stop of the operation of the printhead 205.

To specify the similar communication history, contents of the communication history table may be clustered. Various methods may be used for clustering. If, for example, the k-means method is used, an enormous amount of history information can be classified into the number of set clusters.

After specifying a cluster into which the environment when executing printing is classified, the communication transfer rate is inferred by a statistical value such as an average value or lower limit value from the communication transfer rates of the respective histories classified into the same cluster.

As described above, according to this embodiment, it is possible to acquire the actually measured value of the communication transfer rate under the similar environment from the communication history table instead of the arrangement using the session command. This may be used together with the arrangement using the session command. For example, a statistical value such as an average value or lower limit value of the communication transfer rate obtained according to this embodiment and the communication transfer rate calculated using the session command may be calculated. This arrangement can improve the calculation accuracy of the communication transfer rate.

Note that in this embodiment, the cloud server 108 holds the communication history table. However, the present invention is not limited to this. For example, a PC 103 or a portable terminal 106 may hold the communication history table. Even if the cloud server 108 holds no communication history table, the printer 101 may hold the communication history table, and transmit communication history information to the cloud server 108. The cloud server 108 can accept print commands from a plurality of PCs 103 and a plurality of portable terminals 106, and can transmit image data to a plurality of printers 101. Therefore, the cloud server 108 can collect an enormous number of various kinds of communication history information without limitation to the specific printer 101, portable terminal 106, and printer 101.

Each of the above-described embodiments assumes the inkjet printing apparatus with a serial printhead shown in FIG. 3. However, the present invention is not limited to this. For example, even for the arrangement of a line printhead that covers the print surface width, if the communication transfer rate from the host device is late with respect to the ink droplet discharge operation, discharging of the line printhead is not completed, thereby stopping printing or causing a print blank. Therefore, an appropriate communication transfer rate is obtained by applying the operation of each embodiment, thereby making it possible to prevent the stop of printing or a print blank. Furthermore, the present invention is applicable to a printing apparatus other than the inkjet printing apparatus, and is applicable to, for example, a laser printer. If the communication transfer rate from the host device is late with respect to the exposure operation of the laser printer, irradiation to a charged drum is not completed, thereby causing a print blank on the print medium. Therefore, an appropriate communication transfer rate is obtained by applying the operation of each embodiment, thereby making it possible to prevent a print blank.

In each embodiment, image processing is decided using the flowchart shown in FIG. 9. That is, in the processing shown in FIG. 9, the loop processing is executed in the priority order, and it is determined whether the requested pixel transfer rate is sufficient for the data size of the execution result. The processing of deciding the image processing is not limited to this. For example, it is possible to infer, from information of the image content, the pixel transfer rate after executing the image processing without executing the image processing. For example, the compression result of a similar image content is referred to. Information indicating that the image size is 0.5 times at the time of JPEG compression 1 and the image size is 0.3 times at the time of JPEG compression 2 is held as histories. If the image size of the original image is multiplied by the size ratio after compression, it is possible to infer the pixel transfer rate after executing the image processing without executing the image processing. By inferring the data size without executing the image processing, part or all of the loop processing can be skipped, thereby shortening the processing time on the side of the cloud server 108.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-193564, filed Nov. 29, 2021, which is hereby incorporated by reference herein in its entirety.

What is claimed is:

1. An information processing apparatus capable of communicating with a printing device, comprising:
    an image processing unit configured to execute image processing for image data to be printed by the printing device;
    a transmission unit configured to transmit, to the printing device, image data obtained after executing the image processing;
    a first acquisition unit configured to acquire, before executing the image processing by the image processing unit, a first transfer rate with respect to the printing device and a requested transfer rate required by a print operation of a print unit of the printing device; and
    a second acquisition unit configured to acquire, based on the first transfer rate and information of image data obtained after the image processing unit attempts the image processing for the image data, a second transfer rate required by transmission, to the printing device, of the image data obtained after the attempt and the print operation of the print unit,
    wherein if the second transfer rate satisfies a condition of the requested transfer rate, the image processing unit executes the attempted image processing for the image data, and
    the transmission unit transmits, to the printing device, image data obtained after executing the image processing.

2. The apparatus according to claim 1, wherein the condition is that the second transfer rate is not lower than the requested transfer rate.

3. The apparatus according to claim 1, wherein
    the image processing unit attempts the image processing for the image data in an order of priority levels of settings of a plurality of image processes,
    if the second transfer rate satisfies the condition of the requested transfer rate, the image processing unit executes the set image processing for the image data, and
    the transmission unit transmits, to the printing device, image data obtained after executing the set image processing.

4. The apparatus according to claim 3, further comprising a first storage unit configured to store information indicating the priority levels of the settings of the plurality of image processes,
    wherein in the information, the setting in which a degree of deterioration of an image after executing the image processing is smaller is set with a higher priority level.

5. The apparatus according to claim 4, wherein the first storage unit stores the information indicating the priority levels of the settings of the plurality of image processes in association with a type of content of the image data.

6. The apparatus according to claim 4, wherein each of the plurality of image processes is determined as a set of setting contents of a plurality of processes, and a priority level is provided in accordance with the set of the setting contents.

7. The apparatus according to claim 6, wherein the plurality of processes include at least one of compression, resolution setting, and tone count setting.

8. The apparatus according to claim 6, wherein the plurality of processes include processing concerning the print unit.

9. The apparatus according to claim 8, wherein the processing concerning the print unit includes at least one of conversion into dot data and setting of color count printable by the printing device.

10. The apparatus according to claim 6, further comprising a decision unit configured to decide the plurality of processes based on whether the printing device has a predetermined function.

11. The apparatus according to claim 3, further comprising a determination unit configured to determine a type of content of the image data,
    wherein the image processing unit attempts the image processing for the image data in an order of the priority levels of the plurality of image processes associated with the type of content determined by the determination unit.

12. The apparatus according to claim 11, wherein the type of content includes at least one of a document and a photo.

13. The apparatus according to claim 12, wherein if the type of content determined by the determination unit is the document, the image processing unit changes a setting of a tone count to execute the image processing, and if the type of content determined by the determination unit is the photo, the image processing unit changes a setting of a resolution to execute the image processing.

14. The apparatus according to claim 1, wherein the image data is data corresponding to a page.

15. The apparatus according to claim 14, wherein the attempt of the image processing by the image processing unit and execution of the image processing attempted by the image processing unit are done for each region smaller than the page.

16. The apparatus according to claim 1, wherein the first acquisition unit acquires the first transfer rate by transmitting a request command to the printing device and receiving a response command from the printing device.

17. The apparatus according to claim 1, further comprising a second storage unit configured to store a communication history with the printing device,
wherein the first acquisition unit acquires the first transfer rate based on a transfer rate included in the communication history.

18. The apparatus according to claim 17, wherein the communication history is a communication history for each print operation in the printing device, and includes a transfer rate in the print operation.

19. The apparatus according to claim 1, further comprising a third acquisition unit configured to acquire information of the print unit,
wherein the first acquisition unit acquires the requested transfer rate based on the information of the print unit acquired by the third acquisition unit.

20. The apparatus according to claim 19, wherein the information of the print unit includes at least one of a data processing resolution, a scan speed, and a scan count.

21. An information processing apparatus capable of communicating with a printing device, comprising:
a determination unit configured to determine a type of content of image data to be printed by the printing device;
an image processing unit configured to execute image processing corresponding to the content of the image data determined by the determination unit;
a transmission unit configured to transmit, to the printing device, image data obtained after executing the image processing; and
a first acquisition unit configured to acquire, before executing the image processing by the image processing unit, a first transfer rate with respect to the printing device and a requested transfer rate required by a print operation of a print unit of the printing device,
wherein the type of content includes at least one of a document and a photo,
if the type of content determined by the determination unit is the document, the image processing unit changes a setting of a tone count to execute the image processing, and if the type of content determined by the determination unit is the photo, the image processing unit changes a setting of a resolution to execute the image processing, and
the transmission unit transmits, to the printing device, image data obtained after executing the image processing.

22. A method comprising:
executing, for image data to be printed by a printing device, image processing corresponding to a content of the image data;
transmitting, to the printing device, image data obtained after executing the image processing;
acquiring, before executing the image processing, a first transfer rate with respect to the printing device and a requested transfer rate required by a print operation of a print unit of the printing device;
attempting image processing for the image data; and
acquiring, based on the first transfer rate and information of image data obtained after the attempt, a second transfer rate required by transmission, to the printing device, of the image data obtained after the attempt and the print operation of the print unit,
wherein if the second transfer rate satisfies a condition of the requested transfer rate, the attempted image processing is executed for the image data, and image data obtained after executing the image processing is transmitted to the printing device.

23. A non-transitory computer-readable storage medium storing a program configured to cause a computer to function to:
execute, for image data to be printed by a printing device, image processing corresponding to a content of the image data;
transmit, to the printing device, image data obtained after executing the image processing;
acquire, before executing the image processing, a first transfer rate with respect to the printing device and a requested transfer rate required by a print operation of a print unit of the printing device;
attempt image processing for the image data;
acquire, based on the first transfer rate and information of image data obtained after the attempt, a second transfer rate required by transmission, to the printing device, of the image data obtained after the attempt and the print operation of the print unit; and
execute, if the second transfer rate satisfies a condition of the requested transfer rate, the attempted image processing for the image data, and transmit, to the printing device, image data obtained after executing the image processing.

* * * * *